(12) United States Patent
Chuang et al.

(10) Patent No.: US 12,542,518 B2
(45) Date of Patent: Feb. 3, 2026

(54) MULTI-RATE MULTISTAGE DIGITAL COMPENSATOR FOR NONLINEAR SYSTEMS

(71) Applicant: Analog Devices International Unlimited Company, Limerick (IE)

(72) Inventors: Kevin Chuang, Belmont, MA (US); Ahmed M. R. A. Raslan, Ottawa (CA); Marwen Ben Rejeb, Nepean (CA)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 18/332,323

(22) Filed: Jun. 9, 2023

(65) Prior Publication Data

US 2024/0413797 A1 Dec. 12, 2024

(51) Int. Cl.
*H03F 1/32* (2006.01)
*H04L 27/36* (2006.01)

(52) U.S. Cl.
CPC ......... *H03F 1/3247* (2013.01); *H03F 1/3241* (2013.01); *H03F 1/3252* (2013.01); *H04L 27/368* (2013.01)

(58) Field of Classification Search
CPC ........ H03F 1/32; H03F 1/3241; H03F 1/3247; H03F 1/3252; H03F 3/20; H03F 3/24;
(Continued)

(56) References Cited

U.S. PATENT DOCUMENTS 8,903,015 B2  12/2014  Haddad
8,903,336 B2  12/2014  Fonden
(Continued)

FOREIGN PATENT DOCUMENTS

CN  110533169 A  12/2019
CN  118631186 A  9/2024
(Continued)

OTHER PUBLICATIONS

Chu et al., "A Cascaded Memory Polynomial-Neural Network Behavior Model for Digital Predistortion", 2020 IEEE MTT-S International Conference on Numerical Electromagnetic and Multiphysics Modeling and Optimization (NEMO), Dec. 7, 2020 in 3 pages.
(Continued)

*Primary Examiner* — Young T. Tse
(74) *Attorney, Agent, or Firm* — Knobbe, Martens, Olson & Bear, LLP

(57) ABSTRACT

An adaptable, multistage, multi-rate digital predistortion system that can increase the accuracy of the distortion applied to a power amplifier input signal is disclosed. Further, the digital predistortion system can be implemented using a reduced circuit area by reducing a number of coefficients used by the models applied to generate the distortion compensation signal. Further, the system can implement an improved digital predistortion adaptation engine that improves an adjacent channel leakage ratio of the digital predistortion system. Moreover, the system can compensate for non-linear impairments due to analog/RF circuits and systems and improve at least the following metrics: Error vector magnitude (EVM), adjacent channel leakage ratio (ACLR), spectrum emission mask (SEM), and power consumption of the circuits and systems. An example of circuits and systems is radio frequency power amplifier (RF PA).

18 Claims, 19 Drawing Sheets

(58) Field of Classification Search
CPC ......... H03F 2201/32; H03F 2201/3224; H03F 2201/3227; H04L 27/368
USPC ....... 375/219, 254, 260, 296, 297; 381/94.1; 455/501.1
See application file for complete search history.

(56) References Cited

U.S. PATENT DOCUMENTS

| | | | | |
|---|---|---|---|---|
| 8,982,995 | B1* | 3/2015 | Van Cai | H04B 1/0475 375/297 |
| 9,172,409 | B2 | 10/2015 | Copeland | |
| 9,590,567 | B2 | 3/2017 | Zhao et al. | |
| 10,523,159 | B2 | 12/2019 | Megretski et al. | |
| 2003/0017813 | A1* | 1/2003 | Maruyama | H03F 3/602 455/127.1 |
| 2005/0001684 | A1* | 1/2005 | Braithwaite | H03F 1/3247 330/263 |
| 2005/0157814 | A1* | 7/2005 | Cova | H03F 1/3252 375/297 |
| 2005/0163268 | A1* | 7/2005 | McCallister | H04L 27/3411 375/346 |
| 2012/0069931 | A1* | 3/2012 | Gandhi | H04B 1/62 375/296 |
| 2013/0241645 | A1 | 9/2013 | Bai | |
| 2013/0243119 | A1 | 9/2013 | Dalipi et al. | |
| 2014/0294120 | A1* | 10/2014 | Gandhi | H03F 1/3241 330/149 |
| 2015/0032788 | A1* | 1/2015 | Velazquez | H04L 25/14 708/819 |
| 2016/0254787 | A1* | 9/2016 | Lee | H03F 1/3247 330/96 |
| 2016/0308577 | A1* | 10/2016 | Molina | H04L 27/368 |
| 2018/0337699 | A1* | 11/2018 | Lee | H04B 1/0475 |
| 2019/0348956 | A1 | 11/2019 | Megretski et al. | |
| 2019/0393842 | A1* | 12/2019 | Mochida | H03F 1/3247 |
| 2022/0045713 | A1* | 2/2022 | Muhammad | H04B 1/0475 |
| 2024/0305322 | A1 | 9/2024 | Chuang et al. | |

FOREIGN PATENT DOCUMENTS

| | | |
|---|---|---|
| EP | 4429107 A1 | 9/2024 |
| WO | WO 2014/137783 A2 | 9/2014 |
| WO | WO 2018/148822 A1 | 8/2018 |

OTHER PUBLICATIONS

Extended European Search Report in European Patent Application No. 24179809.9, dated Nov. 15, 2024 in 13 pages.

Safari et al., "Spline-Based Model for Digital Predistortion of Wide-Band Signals for High Power Amplifier Linearization", 2007 IEEE/MTT-S International Microwave Symposium, 2007, pp. 1441-1444, doi: 10.1109/MWSYM.2007.380504.

Extended European Search Report dated Jul. 4, 2024 in European Patent Application No. 24157266.8 in 9 pages.

Lopez-Bueno David et al., "Dataset Reduction for Neural Network Based Digital Predistorters under Strong Nonlinearities", 2021 IEEE Topical Conference on RF/Microwave Power Amplifiers for Radio and Wireless Applications (PAWR), IEEE, Jan. 17, 2021, pp. 8-11.

Sankar, "BER with Matched Filtering", DSP Log, downloaded from https://dsplog.com/2009/05/08/ber-with-matched-filtering/ on Oct. 31, 2024 in 11 pages.

Smith et al., "MUS421/EE367B Lecture 9 Multirate, Polyphase, and Wavelet Filter Banks", Stanford University, Jun. 2, 2020 in 48 pages.

* cited by examiner

| 1-Stage Model | 2-Stage Model | 4-Stage Model |
|---|---|---|
| 219 coefficients | 219 coefficients | 188 coefficients |
| One large model | Stage 1: Nonlinearity focused with 104 coefficients<br>Stage 2: Memory focused with 115 coefficients | 4 Memory Polynomial stages<br>(102 + 32 + 24 + 30 coefficients) |
| $f(x) = \sum_{m=-10,k=1} x(t+\tau_m) +$<br>$\sum_{m=-5,3,k=10} x(t+\tau_m)|x(t+\tau_m)|^k +$<br>$\sum_{m=-5,3,k=10} x(t)|x(t+\tau_m)|^k +$<br>$\sum_{m=-5,3,k=10} x(t+\tau_m)|x(t+\tau_{m-1})|^k$ | $f_1(x) = \sum_{m=-5,k=1} x(t+\tau_m) +$<br>$\sum_{m=-2,3,k=10} x(t+\tau_m)|x(t+\tau_m)|^k +$<br>$\sum_{m=-2,3,k=10} x(t)|x(t+\tau_m)|^k +$<br>$\sum_{m=-2,3,k=10} x(t+\tau_m)|x(t+\tau_{m-1})|^k$ $f_2(x) = \sum_{m=-12,k=1} x(t+\tau_m) +$<br>$\sum_{m=-9,8,k=2} x(t+\tau_m)|x(t+\tau_m)|^k +$<br>$\sum_{m=-9,8,k=2} x(t+\tau_m)|x(t+\tau_m)|^k +$<br>$\sum_{m=-9,8,k=2} x(t+\tau_m)|x(t+\tau_m)|^k$ | $f_1(x) = \sum_{m=-8,9,k=0.5} x(t+\tau_m)|x(t+\tau_m)|^k$<br>$f_2(x) = \sum_{m=-3,4,k=0.5} x(t+\tau_m)|x(t+\tau_m)|^k$<br>$f_3(x) = \sum_{m=-1,4,k=0.5} x(t+\tau_m)|x(t+\tau_m)|^k$<br>$f_4(x) = \sum_{m=-4,4,k=0.5} x(t+\tau_m)|x(t+\tau_m)|^k$ |

FIG. 9

| Total number of coefficients | Worst-case ACLR (dBc) S-LSE \| Backprop GD | Worst-case alternate ACLR (dBc) S-LSE \| Backprop GD | Worst-case OBUE (dBm/MHz) S-LSE \| Backprop GD |
|---|---|---|---|
| 1 stage | 219 | -38.8 | -46.5 | -5.0 |
| 2 stages | 219 | -38.0 \| -43.5 | -46.3 \| -49.9 | -4.3 \| -9.7 |
| 4 stages | 188 | -32.4 \| -48.9 | -44.0 \| -51.8 | 3.1 \| -13.9 |

FIG. 11D

| Total number of coefficients | Worst-case ACLR (dBc) | Worst-case alternate ACLR (dBc) | Worst-case OBUE (dBm/MHz) |
|---|---|---|---|
| 1 stage | 800 | -47.5 | -48.0 | -27.9 |
| 6 stages | 657 | -53.0 | -53.2 | -31.4 |

FIG. 12C

MULTI-RATE MULTISTAGE DIGITAL COMPENSATOR FOR NONLINEAR SYSTEMS

INCORPORATION BY REFERENCE

Any and all applications for which a foreign or domestic priority claim is identified in the Application Data Sheet as filed with the present application are hereby incorporated by reference under 37 CFR 1.57.

TECHNICAL FIELD

The present disclosure relates to a digital predistortion system for a power amplifier.

BACKGROUND

Transceivers may be used by wireless devices to transmit or receive radio frequency signals. Often the signal to be transmitted does not have high enough power to reach its target, such as a base station. Power amplifiers are typically used to increase the signal strength of the signal to be transmitted enabling it to be transmitted greater distances.

SUMMARY

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

In some aspects, the techniques described herein relate to a digital predistortion system configured to distort a power amplifier input signal prior to being input to a power amplifier, the digital predistortion system including: a first compensator including a first plurality of processing circuit blocks, wherein each processing circuit block of the first plurality of processing circuit blocks is configured to implement a transformation function to modify a linearity of a first input signal that is input to the first compensator, and wherein each processing circuit block of the first plurality of processing circuit blocks is connected in parallel within the first compensator; a second compensator connected in series with the first compensator, the second compensator including a second plurality of processing circuit blocks, wherein each processing circuit block of the second plurality of processing circuit blocks is configured to implement a transformation function to modify a linearity of a second input signal that is input to the second compensator, wherein each processing circuit block of the second plurality of processing circuit blocks is connected in parallel within the second compensator, and wherein the second input signal is based at least in part on an output of the first compensator; and a first adder circuit configured to sum an output of each processing circuit block of the second plurality of processing circuit blocks to obtain a digital predistortion signal, wherein the first adder circuit is further configured to provide the digital predistortion signal as an input to the power amplifier.

In some aspects, the techniques described herein relate to a digital predistortion system, wherein at least one of the first plurality of processing circuit blocks or the second plurality of processing circuit blocks implements a neural network.

In some aspects, the techniques described herein relate to a digital predistortion system, wherein the second compensator further includes the first adder circuit.

In some aspects, the techniques described herein relate to a digital predistortion system, wherein each processing circuit block of the first plurality of processing circuit blocks is configured to generate an output that is supplied as an input to a corresponding processing circuit block of the second plurality of processing circuit blocks.

In some aspects, the techniques described herein relate to a digital predistortion system, further including a second adder circuit configured to sum an output of each processing circuit block of the first plurality of processing circuit blocks to obtain an intermediary signal, wherein the intermediary signal is supplied as an input to the second compensator.

In some aspects, the techniques described herein relate to a digital predistortion system, wherein at least one of the first compensator or the second compensator includes a memory that stores signal samples enabling the transformation function to operate over a larger range of samples than a memoryless compensator.

In some aspects, the techniques described herein relate to a digital predistortion system, further including a set of one or more compensators connected in series and between the first compensator and the second compensator.

In some aspects, the techniques described herein relate to a digital predistortion system, wherein a combination of at least the first compensator and the second compensator are configured to generate a distortion of the power amplifier input signal such that a total system response of a system that includes the power amplifier is linear.

In some aspects, the techniques described herein relate to a digital predistortion system, wherein the first compensator further includes a plurality of down sampling circuits corresponding to the first plurality of processing circuit blocks, wherein each of the plurality of down sampling circuits is configured to down sample the first input signal to obtain a down sampled input signal that is input to the corresponding processing circuit block of the first plurality of processing circuit blocks.

In some aspects, the techniques described herein relate to a digital predistortion system, wherein the first compensator further includes a plurality of up sampling circuits corresponding to the first plurality of processing circuit blocks, wherein each of the plurality of up sampling circuits is configured to up sample an output of the corresponding processing circuit block of the first plurality of processing circuit blocks.

In some aspects, the techniques described herein relate to a digital predistortion system, wherein at least one processing circuit block of the first plurality of processing circuit blocks implements a different transformation function than at least one other processing circuit block of the first plurality of processing circuit blocks.

In some aspects, the techniques described herein relate to a digital predistortion system, wherein the transformation function includes one or more of a set of mathematical series or models configured to modify the linearity of an applied signal.

In some aspects, the techniques described herein relate to a digital predistortion system, wherein the transformation function includes one or more weighted coefficients set based on a digital predistortion adaptation circuit configured to determine the one or more weighted coefficients using an adaptive algorithm applied to an output of the power amplifier.

In some aspects, the techniques described herein relate to a digital predistortion system, wherein the transformation function includes one or more weighted coefficients set based on a digital predistortion adaptation circuit configured to determine the one or more weighted coefficients using back propagation and a least square estimate algorithm applied to an output of the power amplifier.

In some aspects, the techniques described herein relate to a transceiver radio including: a power amplifier; and a digital predistortion system in connected series with the power amplifier, the digital predistortion system including: a plurality of compensator circuits connected in series, wherein each compensator circuit of the plurality of compensator circuits includes a plurality of nonlinearity processing circuits connected in parallel and configured to implement a transformation function to modify a linearity of an input signal received at a first compensator circuit of the plurality of compensator circuits; and an adder circuit configured to sum an output of each nonlinearity processor circuit of the plurality of nonlinearity processing circuits of a last compensator circuit of the plurality of compensator circuits to obtain a digital predistortion signal, wherein the adder circuit is further configured to provide the digital predistortion signal as an input to the power amplifier.

In some aspects, the techniques described herein relate to a transceiver radio, further including a crest factor reduction circuit configured to receive a transmit signal and to reduce a peak-to-peak average power ratio of the transmit signal to obtain a reduced peak-to-peak transmit signal, wherein the reduced peak-to-peak transmit signal is provided as the input signal to the digital predistortion system.

In some aspects, the techniques described herein relate to a transceiver radio, further including a digital predistortion adaptation circuit configured to receive an output of the power amplifier and to configure one or more coefficients of the transformation function of at least one compensator circuit of the plurality of compensator circuits based at least in part on the output of the power amplifier.

In some aspects, the techniques described herein relate to a transceiver radio, wherein at least one compensator circuit further includes a plurality of down sampling circuits corresponding to the plurality of nonlinearity processing circuits, and wherein each of the plurality of down sampling circuits is configured to down sample the input signal to obtain a down sampled input signal that is input to the corresponding nonlinearity processing circuit of the plurality of nonlinearity processing circuits.

In some aspects, the techniques described herein relate to a transceiver radio, wherein at least one compensator circuit further includes a plurality of up sampling circuits corresponding to the plurality of nonlinearity processing circuits, and wherein each of the plurality of up sampling circuits is configured to up sample an output of the corresponding nonlinearity processing circuit of the plurality of nonlinearity processing circuits.

In some aspects, the techniques described herein relate to a wireless device including: an antenna configured to emit a signal received from a power amplifier; the power amplifier; a transceiver including a digital predistortion system connected in series with the power amplifier, the digital predistortion system including: a plurality of compensator circuits connected in series, wherein each compensator circuit of the plurality of compensator circuits includes a plurality of nonlinearity processing circuits and linear processing circuits connected in parallel and configured to implement a transformation function to modify a linearity of an input signal received at a first compensator circuit of the plurality of compensator circuits; and an adder circuit configured to sum an output of each nonlinearity processor circuit of the plurality of nonlinearity processing circuits of a last compensator circuit of the plurality of compensator circuits to obtain a digital predistortion signal, wherein the adder circuit is further configured to provide the digital predistortion signal as an input to the power amplifier; a digital predistortion adaptation circuit configured to receive an output of the power amplifier and to configure one or more coefficients of the transformation function of at least one compensator circuit of the plurality of compensator circuits based at least in part on the output of the power amplifier; and a coupler configured to provide the output of the power amplifier to the digital predistortion adaptation circuit.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure. In addition, various features of different disclosed embodiments can be combined to form additional embodiments, which are part of this disclosure. Further, one or more features or structures can be removed or omitted.

FIG. 9 illustrates example system equations for an example multistage multi-rate digital predistortion system using generalized memory polynomial models in accordance with certain embodiments.

FIGS. 11A-11D illustrate measured results of an implementation of a multistage multi-rate digital predistortion system adapted by a digital predistortion adaptation circuit implementing back propagation and least squares estimate adaptive algorithm in accordance with certain embodiments.

FIGS. 12A-12C illustrate measured results of an implementation of a multistage multi-rate digital predistortion system adapted by a digital predistortion adaptation circuit implementing back propagation and least square estimate adaptive algorithm in accordance with certain embodiments.

DETAILED DESCRIPTION OF CERTAIN EMBODIMENTS

The headings provided herein, if any, are for convenience only and do not necessarily affect the scope or meaning of the claimed invention. For the purpose of the present disclosure, the terms mobile devices and wireless devices are used interchangeably.

Introduction

Often new wireless technologies require transmitters to operate more efficiently without compromising the radio frequency performance (e.g., bandwidth and emissions) and implementation area. One area where increased efficiency is desired is with respect to the power amplifier and more specifically, the linearity of the power amplifier.

Figure 1:
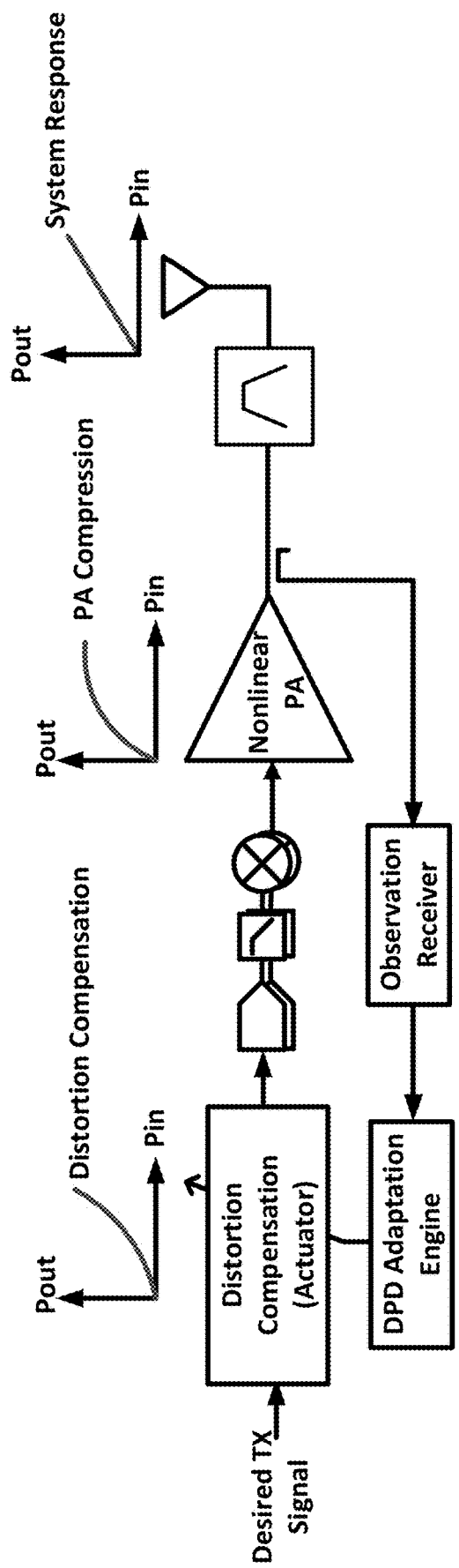
FIG. 1 illustrates an example digital linearization system in accordance with certain embodiments.

As illustrated in FIG. 1, a nonlinear power amplifier can be configured to generate a linear output by distorting an input to the power amplifier such that the total system response is linear. Digital predistortion can be used to distort the desired transmit signal such that the output of the power amplifier is linear. The nonlinear distortion compensation generated by the distortion compensation circuit combined with the nonlinear output of the power amplifier can result in a total system response that is linear.

The distortion generated by the digital predistortion system can be based on the output of the power amplifier. Increasing the accuracy of the digital predistortion can be achieved through the use of more complex models that may be used to determine the distortion to apply to the nonlinear power amplifier. However, increasing the complexity of the models can result in greater circuit area and power consumption.

The present disclosure relates to an adaptable, multistage, multi-rate digital predistortion system that can increase the accuracy of the distortion applied to the power amplifier input signal. In other words, the system disclosed herein can reduce the error between the generated distortion signal and the power amplifier output. Further, the digital predistortion system can be implemented using a reduced circuit area by reducing a number of coefficients used by the models applied to generate the distortion compensation signal. Further, the system can implement an improved digital predistortion adaptation engine that improves an adjacent channel leakage ratio of the digital predistortion system. Moreover, the system can compensate for non-linear impairments due to analog/RF circuits and systems and improve at least the following metrics: Error vector magnitude (EVM), adjacent channel leakage ratio (ACLR), spectrum emission mask (SEM), and power consumption of the circuits and systems. An example of circuits and systems is radio frequency power amplifier (RF PA).

Digital Predistortion System

Figure 2:
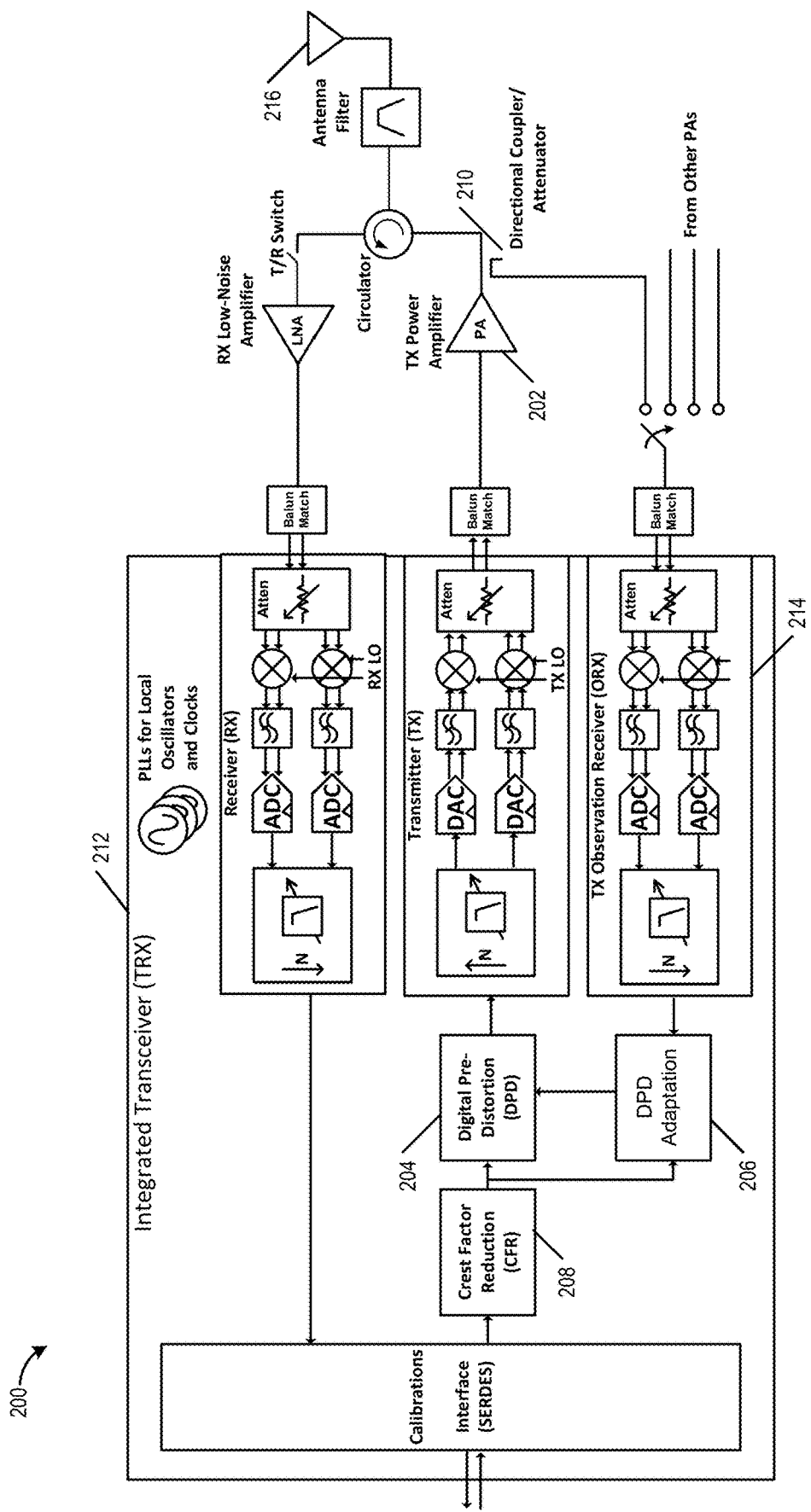
FIG. 2 illustrates a portion of a wireless system that includes a transceiver that implements digital predistortion in accordance with certain embodiments.

FIG. 2 illustrates a portion of a wireless system 200 that includes an integrated transceiver or a transceiver radio that implements digital predistortion in accordance with certain embodiments. The wireless system 200 may include, among other circuit elements and systems, a transceiver radio 212 (or integrated transceiver), a power amplifier 202, and a coupler 210. The transceiver radio 212 may include a digital predistortion system 204, a digital predistortion adaptation system 206 (DPD), a crest factor reduction circuit 208 (CFR), and a transmitter observation receiver 214, among other systems and circuitry.

In some embodiments, the transceiver radio 212 may include a digital front end (DFE). The DFE can help transition between analog RF and digital baseband processing by the wireless system 200. The DFE can include at least the digital predistortion system 204, digital predistortion adaptation system 206, and crest factor reduction circuit 208.

In some embodiments, the transceiver radio 212 can include the power amplifier 202. In some embodiments, the transceiver radio 212 outputs a signal for transmission that is provided to the power amplifier 202 to increase the signal strength of the signal for emission by the antenna 216. The coupler 210 can be used to provide a power signal or power measurement from the output of the power amplifier 202 to the transmitter observation receiver 214, which can determine the signal output by the power amplifier 202 based on the measured power received from the coupler 210. The output signal may be provided by the transmitter observation receiver 214 to the digital predistortion adaptation system 206. The digital predistortion adaptation system 206, as described in more detail below, can use the power amplifier 202 output signal to determine one or more coefficient values for configuring one or more models used by the digital predistortion system 204 to determine a distortion or predistortion signal to apply to the transmit signal prior to being provided to the power amplifier 202. Thus, a feedback mechanism can be used to configure the digital predistortion system 204 enabling an improved compensation system for converting the nonlinear power amplifier 202 output into a linear system response for the wireless system 200 or the transceiver radio 212 of the wireless system 200.

The digital predistortion system 204 can be implemented as a series of compensators or compensation circuits. Each of these compensation circuits can implement different functionality, algorithms, models, or transformation functions, including machine learning based models. In some embodiments, the digital predistortion system 204 can be a multistage system that includes a plurality of compensation circuits connected in series. Advantageously, by using a multistage system, the number of coefficients included in the implemented models can be reduced while not increasing the amount of power leaking into adjacent channels. Moreover, in some cases, the adjacent channel leakage ration may be reduced. The reduction in the number of coefficients may not only increase efficiency while improving performance, but may also reduce circuit area due, for example, to the reduction in the number of supported coefficients necessary to implement the models executed by the compensation circuits.

The digital predistortion system 204 may apply distortion to an input signal corresponding to a signal to be transmitted. The input signal may be received from the crest factor reduction circuit 208. The crest factor reduction circuit 208 may reduce a peak-to-peak average power ratio of the signal to be transmitted to obtain a reduced peak-to-peak transmit signal. This reduced peak-to-peak transmit signal may be provided as the input to the digital predistortion system 204, which may in turn pre-distort the received signal before it is provided to the power amplifier 202. As illustrated in FIG. 2, the output of the digital predistortion system 204 may be provided to other subsequent circuitry (e.g., a transmitter that includes upsamplers, digital to analog converters, mixers, local oscillators, etc.) before it is provided to the power amplifier 202, which may be a separate circuit or may be included as part of the transmitter. Further, the digital predistortion system 204 may apply the pre-distortion based at least in part on feedback received from the power amplifier 202, which is used by the digital predistortion adaptation system 206 to configure the digital predistortion system 204.

Figure 3A:
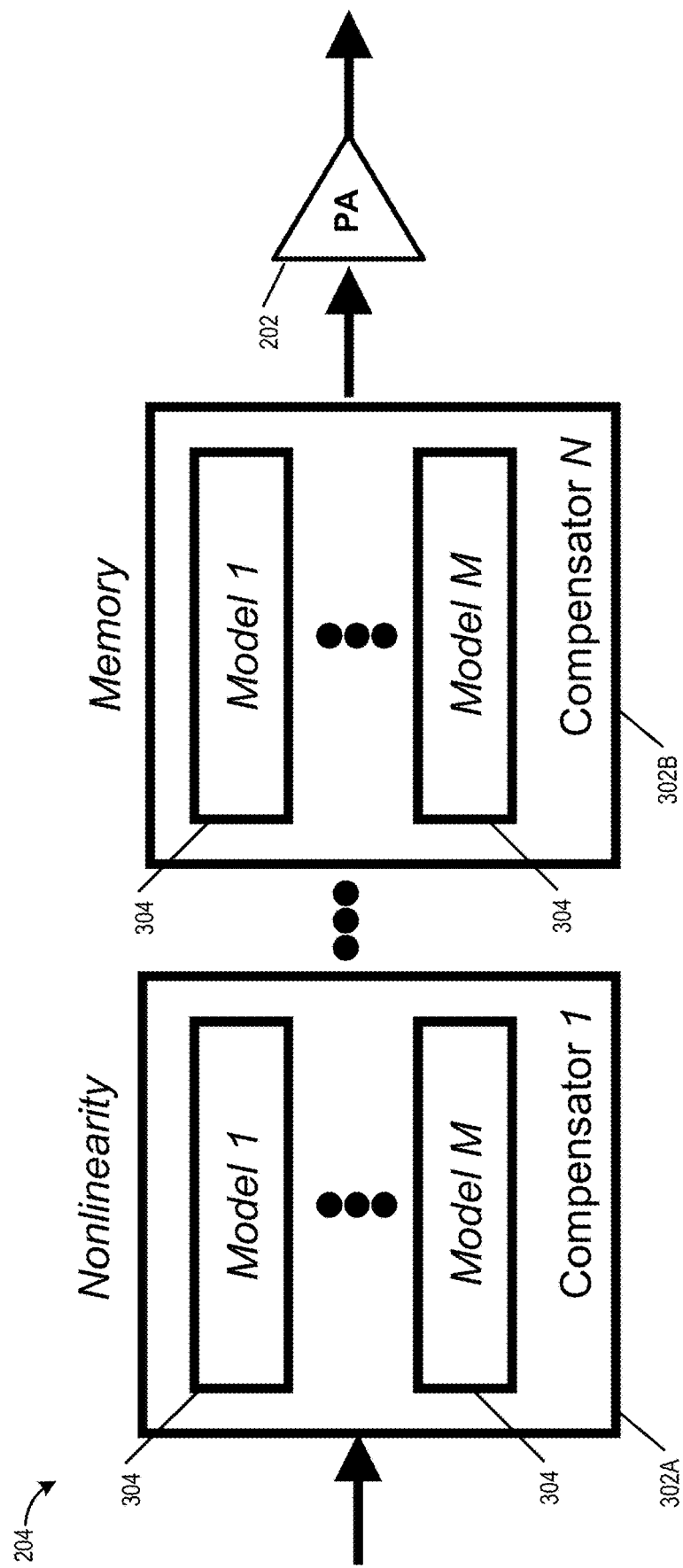
FIGS. 3A-3C illustrate several example multistage implementations of a digital predistortion system in accordance with certain embodiments.
Figure 3B:
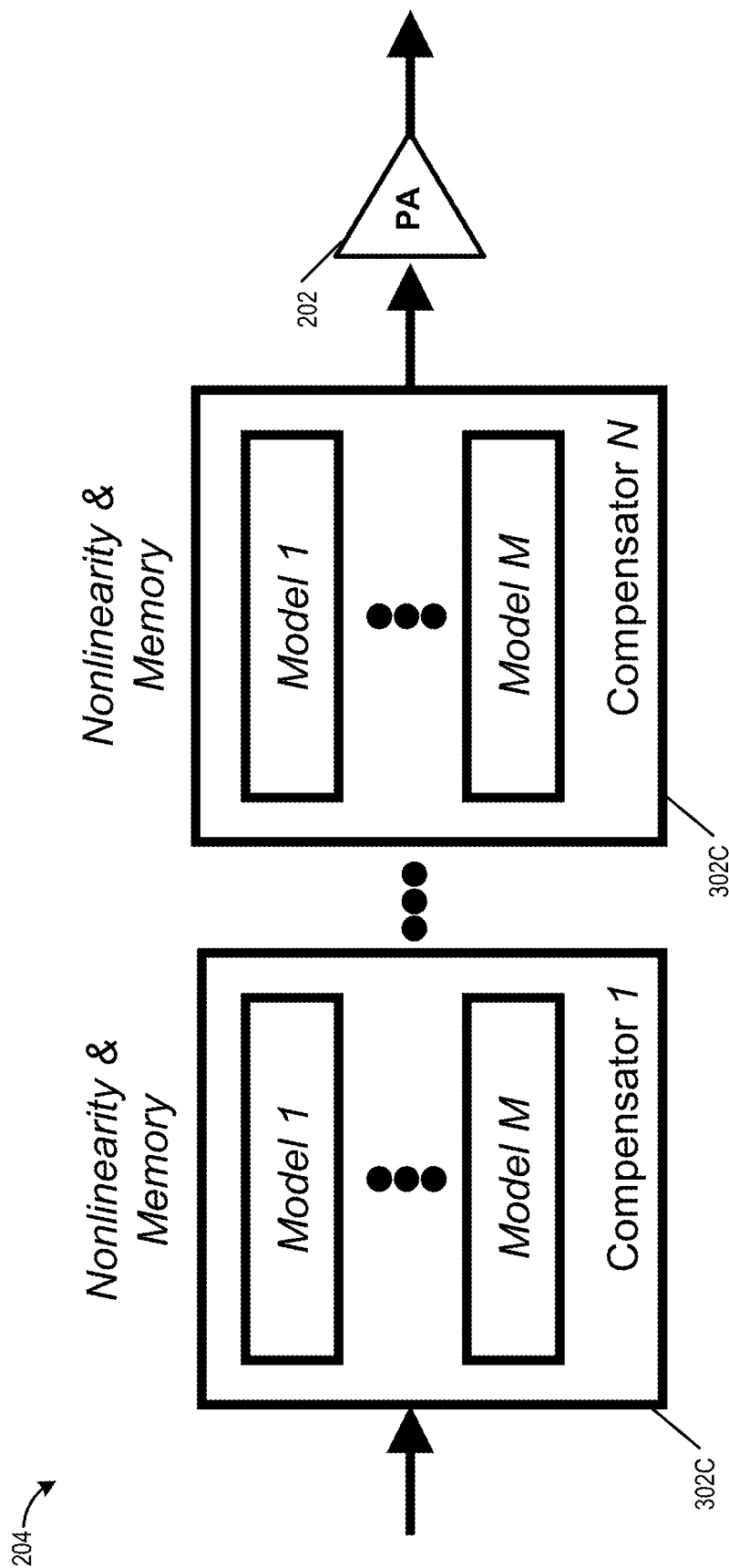
Figure 3C:
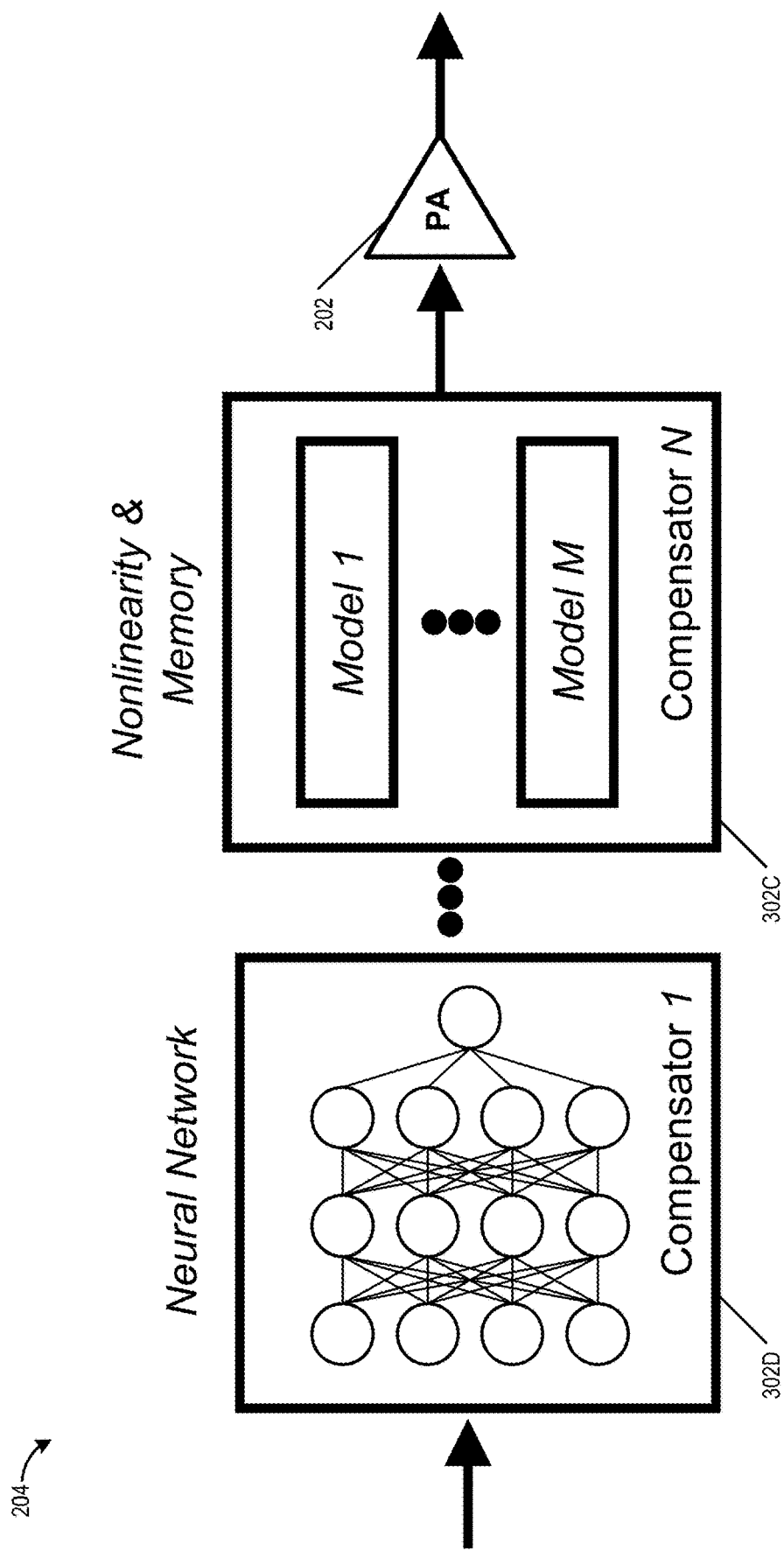

FIGS. 3A-3C illustrate several example multistage implementations of a digital predistortion system 204 in accordance with certain embodiments. As illustrated in FIG. 3A, the digital predistortion system 204 may include a compensator 302A and a compensator 302B. The compensators may collectively or individually be referred to as compensators 302 or compensator 302. Further, although only two compensators 302 are illustrated, the digital predistortion system 204 may include up to N compensators where N may include any integer number greater than 2.

Each of the compensators 302 may include models 304. The models 304 may include a set of one or more models. In implementations where the compensators 302 include a plurality of models 304, the models 304 may be connected in parallel within the compensators 302. Each of the models 304 may include any type of algorithm or model that may be used to determine an amount of predistortion to apply to a transmit signal prior to input to the power amplifier 202. Further, the algorithm or model may use an output from the power amplifier 202 to facilitate determining the predistortion to apply to the transmit signal and/or to configure the algorithm or model used to determine the predistortion to apply to the transmit signal. In some cases, the algorithm or model may include a machine learning based model. Some non-limiting examples of models, transformation functions, or mathematical series that may be implemented by the models 304 of the compensators 302 include: Taylor series, Volterra series, piecewise functions, Saleh model, memory polynomial, orthogonal memory polynomial, exponentially shaped memory delay polynomial, envelope memory polynomial, generalized memory polynomial, dynamic deviation reduction, long-term memory model, band-limited model, power-dependent model, dynamic power model, spline-interpolated lookup table, or multi-band model, among others. Further, in some embodiments, the models 304 may include a neural network or other machine learning based model.

The output of the first stage of the digital predistortion system 204 (e.g., the compensator 302A) may be provided as an input to the next stage of the digital predistortion system 204. The output of the final stage of the digital predistortion system 204 (e.g., the compensator 302B) may be provided as an input to the power amplifier 202. In some embodiments, there may be circuitry between the digital predistortion system 204 and the power amplifier 202 that may further process the signal output by the 302B before it is provided to the power amplifier 202 as illustrated, for example, in FIG. 2.

In some embodiments, each of the compensators 302 may be configured to implement different models or to perform different operations with respect to generating the predistortion. For example, as illustrated in FIG. 3A, the compensator 302A may implement nonlinearity models that introduce nonlinearity to the received signal. And the compensator 302B may include memory that enables operations to account for a larger set or a larger range of samples of the processed signal. For example, while the compensator 302A may process a smaller set of samples at a time (e.g., 1, 5, 10, etc.), the compensator 302B may process a larger set of samples (e.g., 10, 20, 50, etc.). It should be understood that other configurations are possible.

For example, FIG. 3B illustrates that the digital predistortion system 204 may include at least two compensators 302C that may each implement nonlinearity and memory-based models. In other words, the compensators 302C may each introduce nonlinearity determined based on a set of current or previously received samples obtained from the input signal. The compensators 302C may include a memory and/or may access a sliding window of samples of the input signal that enable the compensators 302C to apply the distortion window over a larger number of samples than a memoryless compensator 302.

FIG. 3C illustrates another example digital predistortion system 204 that includes a compensator 302D that implements a neural network. The compensator 302D may be connected to any other type of compensator 302 including a second compensator 302D. In the example illustrated in FIG. 3C, the compensator 302D may be connected in series to a compensators 302C.

Figure 4:
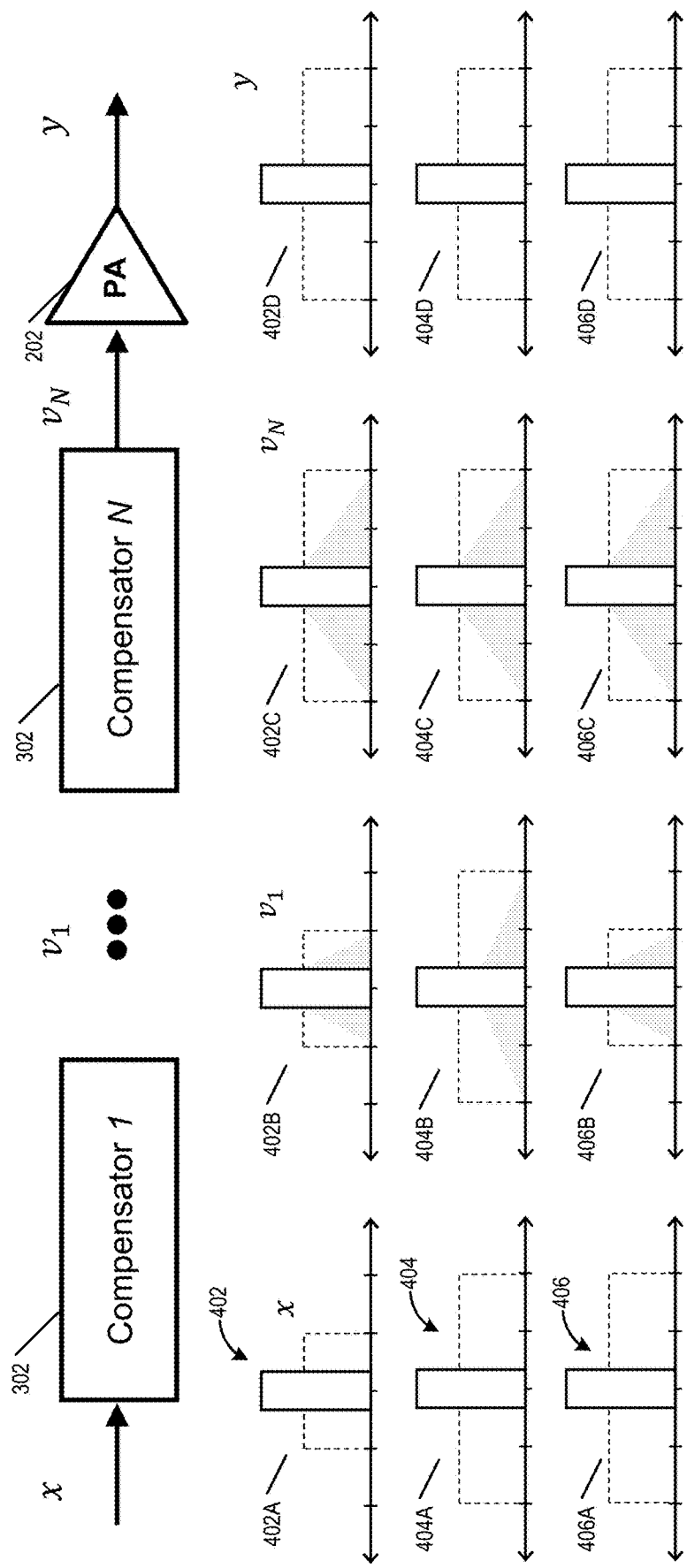
FIG. 4 illustrates several examples of processing a crest factor reduction signal at different sampling rates by a multistage multi-rate digital predistortion system in accordance with certain embodiments.

FIG. 4 illustrates several examples of processing a crest factor reduction signal at different sampling rates by a multistage multi-rate digital predistortion system in accordance with certain embodiments. The crest factor reduction signal may be a reduced peak-to-peak transmit signal. This transmit signal may be supplied as an input to the digital predistortion system 204, which may in turn be an input to a first compensator 302 of a plurality of compensators 302 connected in series as part of the digital predistortion system 204. The compensators 302 may output the crest factor signal that has been distorted through the application of predistortion by the compensators 302 to the power amplifier 202.

In the examples of FIG. 4, a first graph (e.g., graph 402A, 404A, or 406A) is provided to illustrate the input to the digital predistortion system 204, a second graph (e.g., graph 402B, 404B, or 404C) is provided to illustrated the output of the first compensator 302 within the digital predistortion system 204, a third graph (e.g., graph 402C, 404C, 406C) is provided to illustrate the output of the last compensator 302 of the digital predistortion system 204, which may be provided to the power amplifier 202, and a fourth graph (e.g., graph 402D, 404D, 406D) is provided to illustrate the output of the power amplifier 202.

Advantageously, in certain embodiments, the multistage multi-rate digital predistortion system 204 of the present disclosure enables a reduction in the power consumption of the crest factor reduction circuit 208, which can in turn reduce the overall power consumption of a wireless system 200. The power consumption of the crest factor reduction circuit 208 can be reduced by operating the crest factor reduction circuit 208 at a reduced sampling rate, which is possible due, for example, to the multi-rate capability of the digital predistortion system 204 of the present disclosure. In the first example, illustrated by the graph 402A, the crest factor reduction circuit 208 output is at a reduced sampling rate as illustrated by the area of the dashed line box as compared to the graph 404A or the graph 406A of the second and third examples where the output of the crest factor reduction circuit 208 is at the full supported sampling rate. Continuing with the first example, the first compensator 302 may maintain the same sampling rate as the output of the crest factor reduction circuit 208 as illustrated by the graph 402B representing the output of the first compensator 302.

The last compensator 302 may then upsample the received signal as illustrated by the graph 402C and the output of the power amplifier 202 may match the sampling rate of the output of the digital predistortion system 204 as illustrated by the graph 402D.

In the second example, the output of the crest factor reduction circuit 208 may be at the full sampling rate as illustrated by the graph 404A. The first compensator 302 may maintain the same sampling rate as illustrated by the graph 404B illustrating the output of the first compensator 302, which may be supplied as an input to the last (second in the illustrated example) compensator 302. The output of the last compensator 302 may remain at the full sampling rate (illustrated by the graph 404C) as may the output of the power amplifier 202 (illustrated by the graph 404D).

In the third example, the output of the crest factor reduction circuit 208 may be at the full sampling rate as illustrated by the graph 406A. However, unlike the second example, the first compensator 302 may reduce the sampling rate (e.g., down sample) of the processed signal as illustrated by the graph 406B illustrating the output of the first compensator 302, which may be supplied as an input to the last (second in the illustrated example) compensator 302. The last compensator 302 may upsample the received signal to return the signal to the full sampling rate as illustrated by the graph 404C. The output of the power amplifier 202 (illustrated by the graph 404D) may remain at the full sampling rate.

Figure 5:
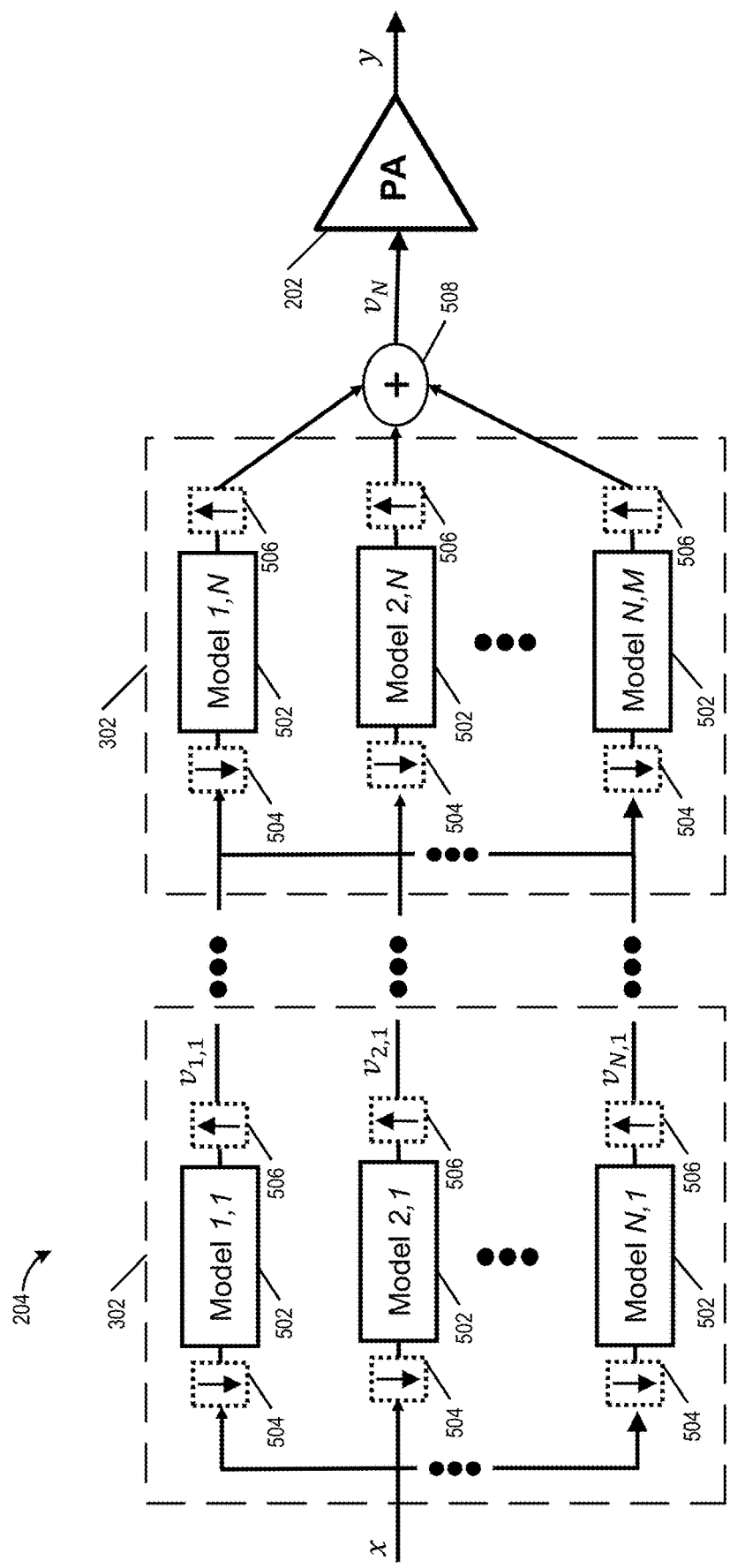
FIG. 5 illustrates an example implementation of a multistage multi-rate digital predistortion system in accordance with certain embodiments.

FIG. 5 illustrates an example implementation of a multistage multi-rate digital predistortion system 204 in accordance with certain embodiments. As previously described, each of the compensators 302 can implement or execute a series of parallel models (e.g., the models 502). Each of the model 502 may be a type of transformation function or machine learning model that can be used to modify a linearity of an input signal. The models 502 may be the same type or different types of models (e.g., Volterra series, neural networks, generalized memory polynomials, etc.). Further, each model 502 may be preceded by a down sampling circuit 504 and each model 502 may be followed by an upsampling circuit 506. As described with respect to the examples in FIG. 4, in some cases, the compensators 302 may down sample and/or up sample the signal provided to the model 502 or output by the model 502. In some cases, down sampling or up sampling is not performed by some compensators 302 (or models 502). In such cases, the down sampling circuit 504 or upsampling circuit 506 may be omitted. Alternatively, the down sampling circuit 504 and/or upsampling circuit 506 may remain but may not be used. Thus, in some embodiments, it is possible to dynamically configure the compensators 302 to modify the sample rate of the signal processed by the compensators 302.

The output of each model 502 of the compensator 302 can be provided as an input to a corresponding model 502 in a subsequent compensator 302 within the same signal path. Thus, for example, the output of the model 1,1 can be provided as an input to the model 1,2 (not shown), and the output of the model 1,2 may be provided as an input to the next model and so on and so forth until reaching the model 1,N. The outputs of the models 502 of the last compensator 302 of the digital predistortion system 204 are all at the same sample rate. If the output of one series of models 502 (e.g., model 1,N) is at a different sample rate than the output of another series of models 502 (e.g., model 2,N) the upsampling circuit 506 of the model with the lower sample rate can upsample the output of the model 502 such that all the models generate an output at the same sample rate. The outputs of each of the models 502, which may be after upsampling in certain cases, may be provided to an adder or summing circuit 508 to generate a single signal, which may then be provided to the power amplifier 202, or intermediary circuitry (not shown) prior to the power amplifier 202.

Figure 6:
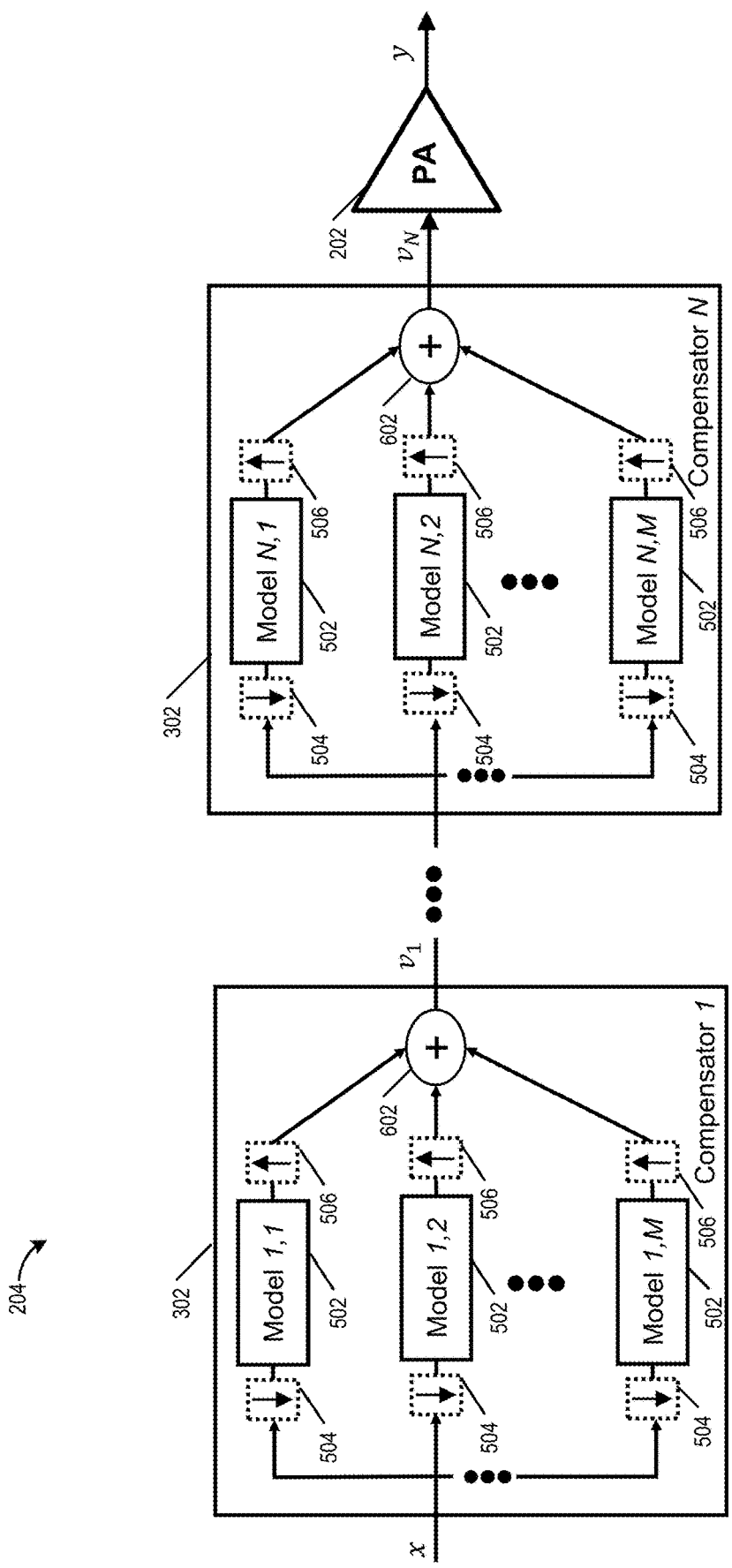
FIG. 6 illustrates another example implementation of a multistage multi-rate digital predistortion system in accordance with certain embodiments.

FIG. 6 illustrates another example implementation of a multistage multi-rate digital predistortion system 204 in accordance with certain embodiments. In the example illustrated in FIG. 6, the output of each set of models 502 of each compensator 302 may be provided to an adder or summation circuit 602. Thus, each compensator 302 may receive a single input signal and each model 502 within a compensator 302 may receive the same input. Moreover, as the sampling rates should match in order to combine the outputs of each model 502, the upsampling circuits 506 may be used to ensure that the outputs of each model 502 for a given compensator 302 have the same sampling rate.

As previously described, the digital predistortion adaptation system 206 may be used to configure the digital predistortion system 204 based at least in part on the output of the power amplifier 202 and the output of the crest factor reduction circuit 208. Configuring the digital predistortion system 204 may include setting the coefficients or weights of variables within the models 502 of the compensators 302 of the digital predistortion system 204.

Figure 7:
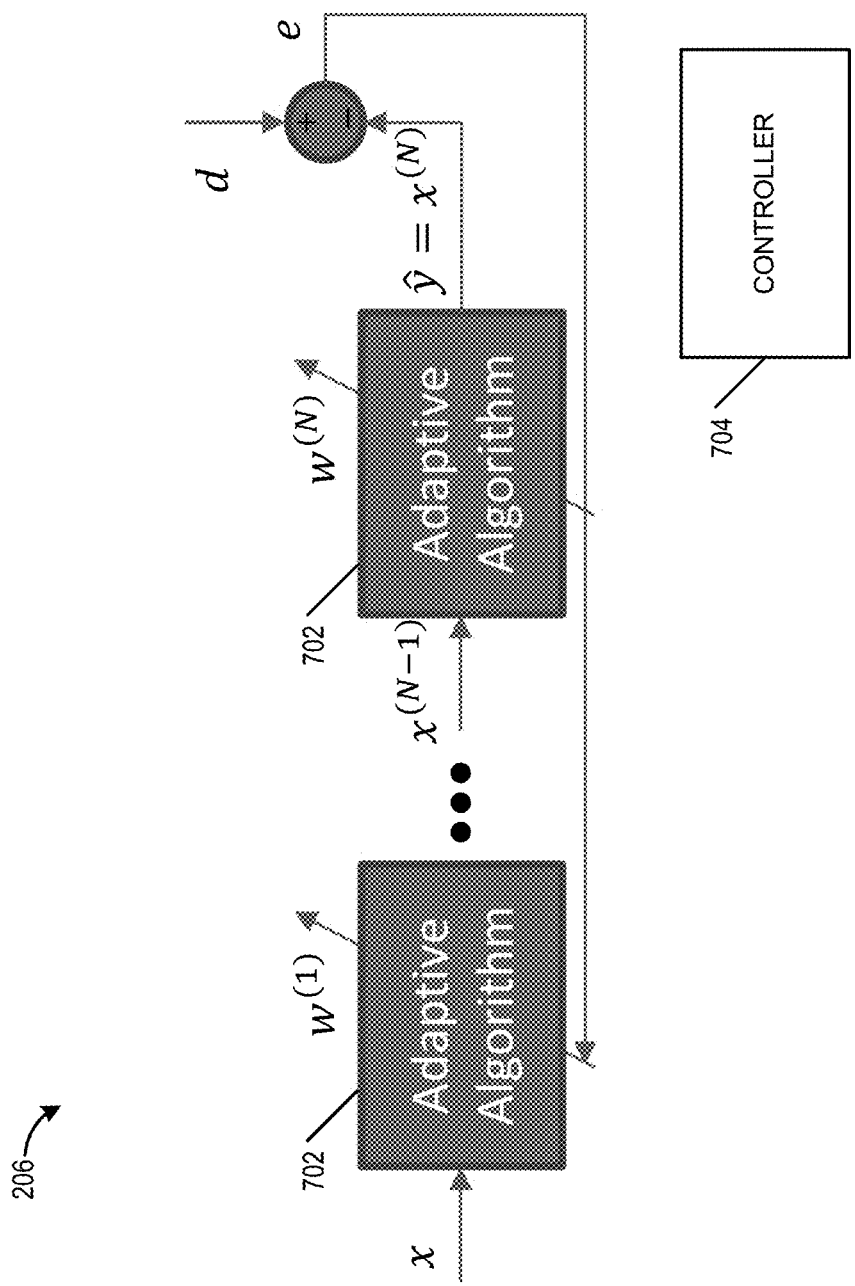
FIG. 7 illustrates an example implementation of a digital predistortion adaptation circuit implementing a least square estimate adaptive algorithm in accordance with certain embodiments.

FIG. 7 illustrates an example implementation of a digital predistortion adaptation circuit 206 implementing a least square estimate adaptive algorithm in accordance with certain embodiments. In certain embodiments, the digital predistortion adaptation system 206 may include a set of circuits or processors 702 configured to implement adaptive algorithms to determine the weighted values for the models 502 implemented by the digital predistortion adaptation system 206. There may be up to N processors 702 each configured to implement an adaptive algorithm for an N-stage model. Alternatively, there may be a single processor 702 configured to implement the N adaptive algorithm instances for an N-stage model. The adaptive algorithms, or the processors 702 implementing the adaptive algorithms, may be controlled be a controller 704 that may determine when the error difference between the output of the power amplifier 202 and the input to the digital predistortion adaptation system 206 satisfies a threshold (e.g., is less than a particular error value). The controller 704 may be included as part of the digital predistortion adaptation system 206. The digital predistortion adaptation system 206 may implement a least squares estimate (LSE) adaptive algorithm. The use of adaptive algorithms by the digital predistortion adaptation system 206 to configure the coefficients of the digital predistortion system 204 can result in reduced adjacent channel leakage ratio (ACLR).

Figure 8:
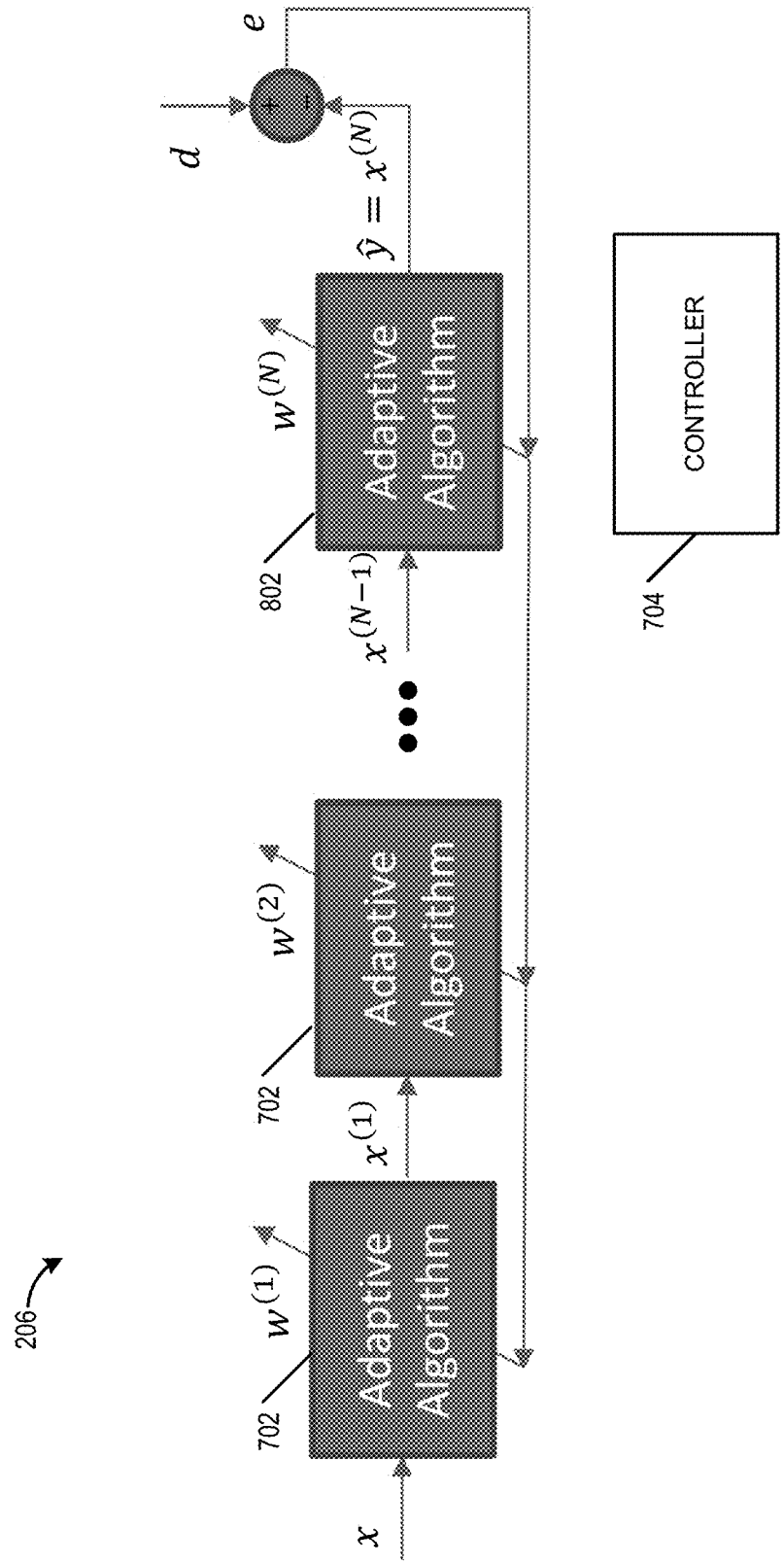
FIG. 8 illustrates an example implementation of a digital predistortion adaptation circuit implementing a back propagation and least square estimate adaptive algorithm in accordance with certain embodiments.

FIG. 8 illustrates an example implementation of a digital predistortion adaptation circuit 206 implementing a back propagation and least square estimate adaptive algorithm in accordance with certain embodiments. In certain embodiments, combining back propagation with LSE improves the ACLR of the digital predistortion system 204. Solving the least squares problem N times can be both fast and computationally efficient. Further, optimizing the first N−1 stages using a back propagation algorithm can provide a more optimized solution compared to the use of LSE only. The digital predistortion adaptation system 206 of FIG. 8 can include the same elements as the digital predistortion adaptation system 206 of FIG. 7. However, the digital predistortion adaptation system 206 of FIG. 8 may include an additional processor 802 that can perform LSE after the processors 702 perform the adaptive algorithm using back propagation to compare the output of the power amplifier 202 to the input provided to the digital predistortion adaptation system 206 for each coefficient of the model 502 processed by the compensator 302.

This calibration strategy implemented by the digital predistortion adaptation system 206 to calibrate the coefficients of the model 502 may include solving for $x^{(N)}$ by feed forwarding the input x through all the stages (corresponding to the processors 702 or other computational circuitry) of the adaptive algorithm. Each of the outputs $x^{(1)}$ thought $x^{(N)}$ may be solved as follows:

$$x^{(1)} = B_1(x)W^{(1)}$$
$$\vdots$$
$$x^{(N)} = B_N(x^{(N-1)})W^{(N)}$$

The error function may be calculated as follows:

$$E = \frac{1}{S}\sum_{s=1}^{S}(x_s^{(N)} - d_s)^2$$

The calculated error may be compared by the controller 704 to a threshold. If it is determined that the calculated error is small enough (e.g., less than the threshold), then the processors 702 can output the calculated weights, w, as the coefficient values for the model 502 of the compensator 302. The weights can be calculated as follows:

$$W_i^{(n)} = W_{i-1}^{(n)} - lr\frac{\partial E}{\partial W^{(n)}}: 1 \le n \le N-1$$

Further, the $W^{(1)} \ldots W^{(N-1)}$ at $i^{th}$ iteration can be updated using back propagation (BP). Moreover, the additional processor 802 can determine $W^{(N)}$ using LSE with the following objective function:

$$J_N = J(w^{(N)}) = \|d - B_N(x^{(N-1)})w^{(N)}\|_2^2 + \lambda^{(N)}\|w^{(N)}\|_2^2$$

The calculations can be repeated until there is a convergence as determined by the error calculated by the error function being less than a threshold value.

FIG. 9 illustrates example system equations for an example multistage multi-rate digital predistortion system 204 using generalized memory polynomial models in accordance with certain embodiments. As illustrated by the table in FIG. 9, although the use of a 2-stage digital predistortion system 204 can improve efficiency and reduce complexity, the number of coefficients remains the same. However, a 4-stage digital predistortion system 204 results in a reduction from 29 coefficients to 188 coefficients reducing the circuit size of the digital predistortion system 204, reducing power requirements, and improving overall performance of the digital predistortion system 204 including improving the nonlinearity of the digital predistortion system 204, which in combination with the nonlinearity of the power amplifier 202 results in an improvement of the linearity of the overall system (e.g., the wireless system 200).

Figure 10:
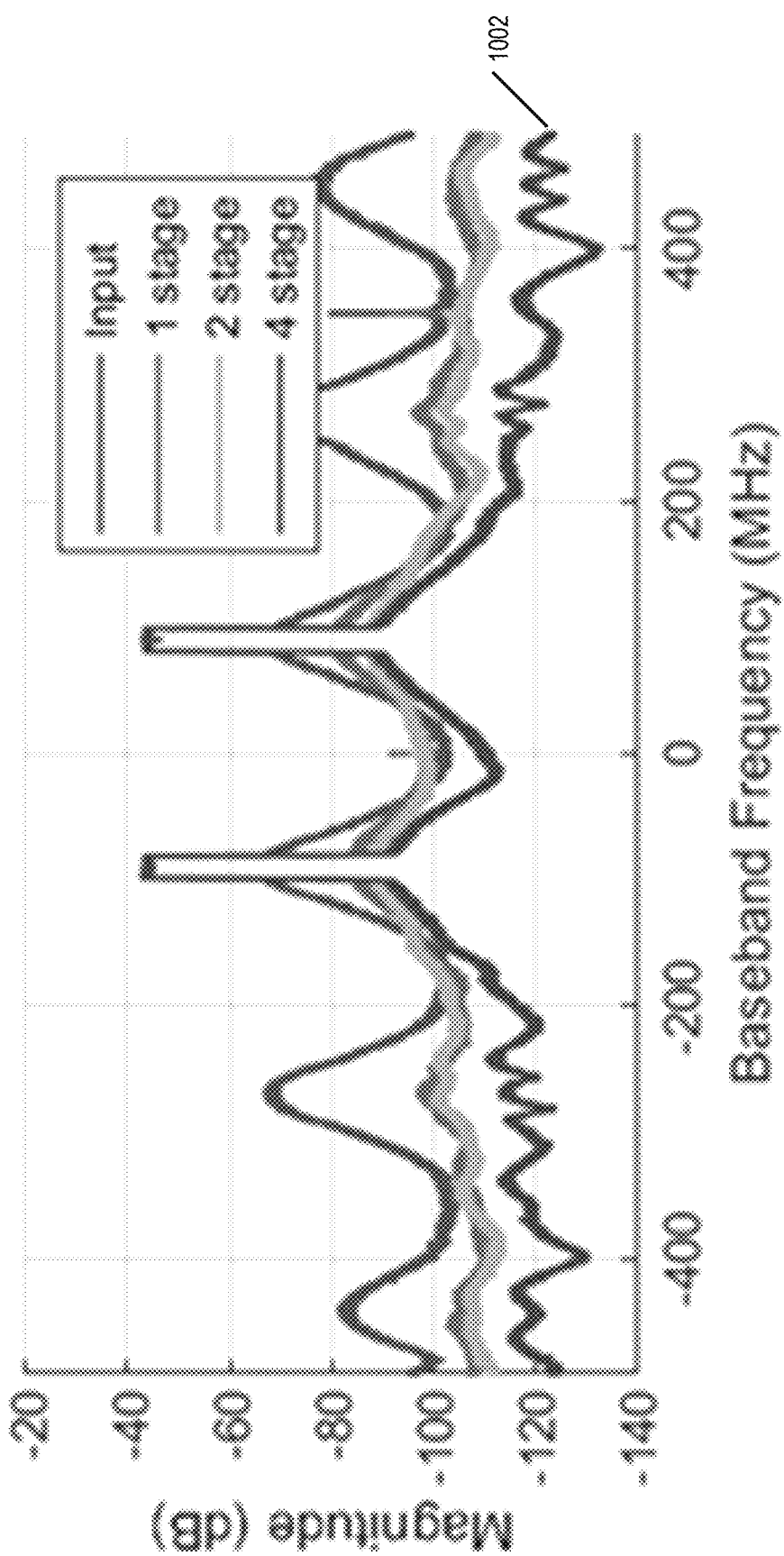
FIG. 10 illustrates simulation results of a multistage multi-rate digital predistortion system adapted by a digital predistortion adaptation circuit implementing a back propagation and least squares estimate adaptive algorithm in accordance with certain embodiments.

FIG. 10 illustrates simulation results of a multistage multi-rate digital predistortion system 204 adapted by a digital predistortion adaptation circuit 206 implementing a back propagation and least squares estimate adaptive algorithm in accordance with certain embodiments. Further, the graph of FIG. 10 graphically illustrates the improvement of ACLR for the 4-stage digital predistortion system 204 compared to the input, 1-stage, and 2-stage digital predistortion with the bottom most line 1002 representing the 4-stage digital predistortion system 204.

Figure 11A:
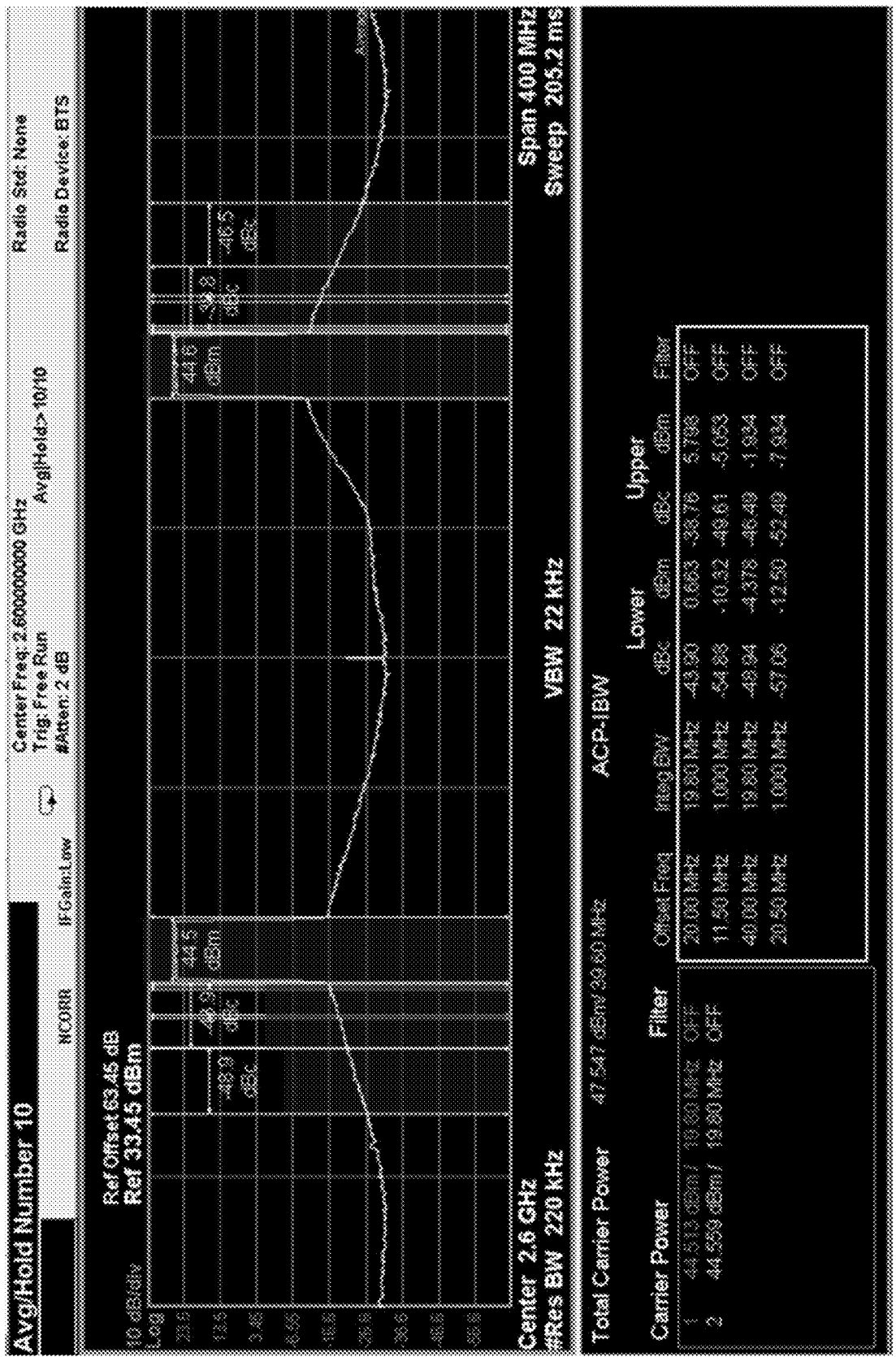
Figure 11B:
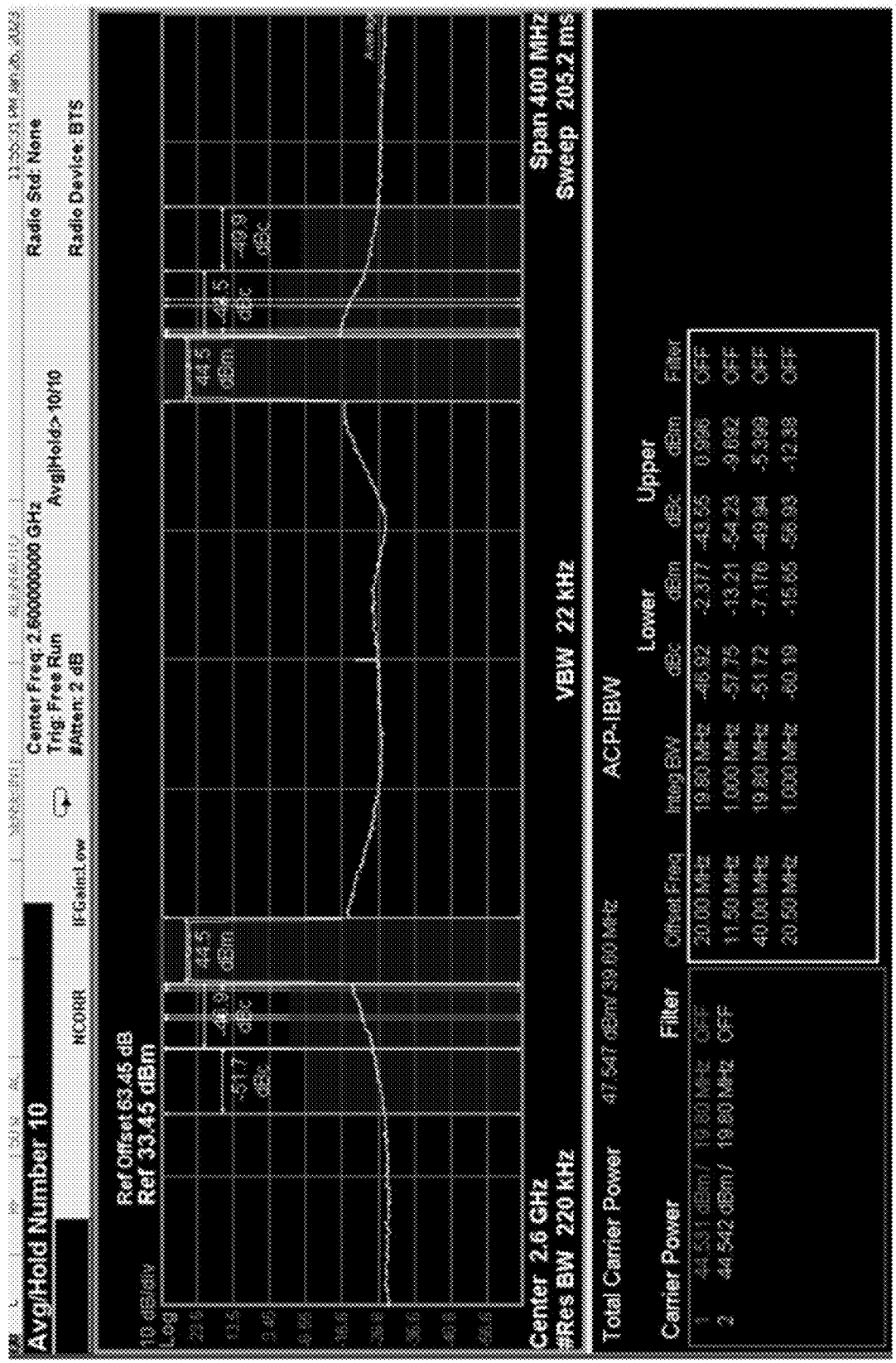
Figure 11C:
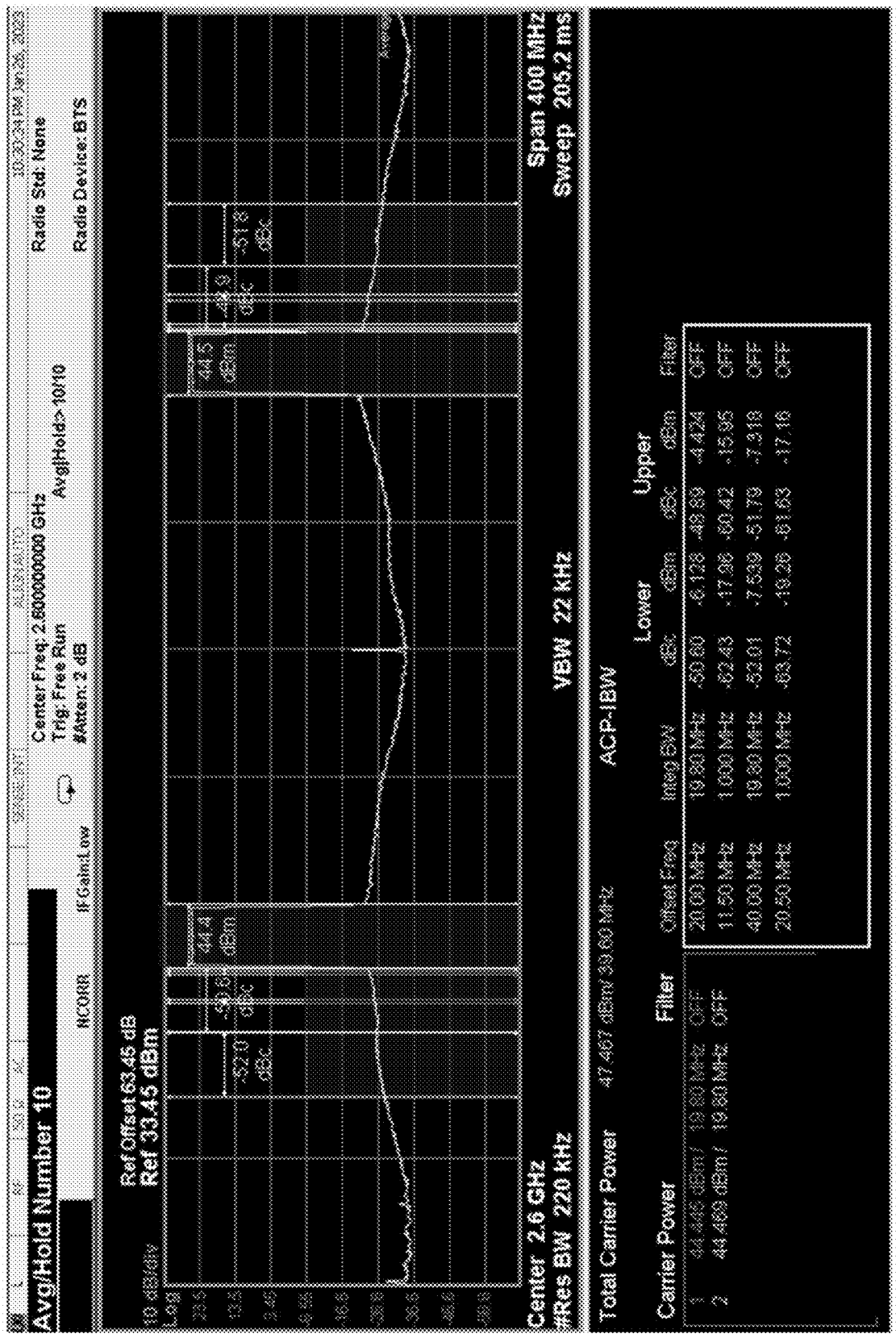

FIGS. 11A-11D illustrate measured results of an implementation of a multistage multi-rate digital predistortion system adapted by a digital predistortion adaptation circuit implementing back propagation and least squares estimate adaptive algorithm in accordance with certain embodiments. FIG. 11A illustrates measurements for a 1-stage digital predistortion system 204 processing a signal with a 2.6 GHz center frequency. FIG. 11B illustrates measurements for a 2-stage digital predistortion system 204 processing the same signal as FIG. 11A. FIG. 11C illustrates measurements for a 4-stage digital predistortion system 204 processing the same signal as FIG. 11A. Comparing the 1-stage, 2-stage, and 4-stage graphs illustrated in FIGS. 11A-11C, it can be seen that there is an improvement in both the low frequency band ACLR and high frequency band ACLR with the addition of more stages within the digital predistortion system 204.

FIG. 11D presents a table illustrating the improvement between the 1-stage, 2-stage, and 4-stage digital predistortion systems 204. As illustrated in the table, the number of coefficients remains the same between the 1-stage and 2-stage digital predistortion system 204. However, there is a reduction in the number of coefficients with the 4-stage digital predistortion system 204 reducing both power and area in the implementation of the digital predistortion system 204 while also improving the ACLR as indicated in the table. As illustrated by the table in FIG. 11D, the ACLR improvement between 1-stage and 2-stages for the digital predistortion system 204 is at least 3 dB. Further, when going from 2-stages to 4-stages, there is at least a 2 dB improvement while having a reduction in the number of coefficients. Further, a total improvement of almost 10 dB/MHz is obtained between 1-stage and 4-stages for operating band unwanted emissions (OBUE).

Moreover, the table in FIG. 11D illustrates measured results of a multistage multi-rate digital predistortion system 204 adapted by a digital predistortion adaptation circuit 206 implementing a least squares estimate adaptive algorithm and by a digital predistortion adaptation circuit implementing back propagation and least squares estimate adaptive algorithm in accordance with certain embodiments. As illustrated by the table in FIG. 11D, when calibrating the digital predistortion system 204 using only LSE for the digital predistortion adaptation system 206, improvement may be limited. However, when calibrating the digital predistortion system 204 using both back propagation and LSE for the digital predistortion adaptation system 206, the measurements indicate an improvement in offline ACLR between 1-stage and a 4-stage digital predistortion system 204 of over 10 dB for the worse-case ACLR and over 5 dB for the worst-case alternate ACLR.

Figure 12A:
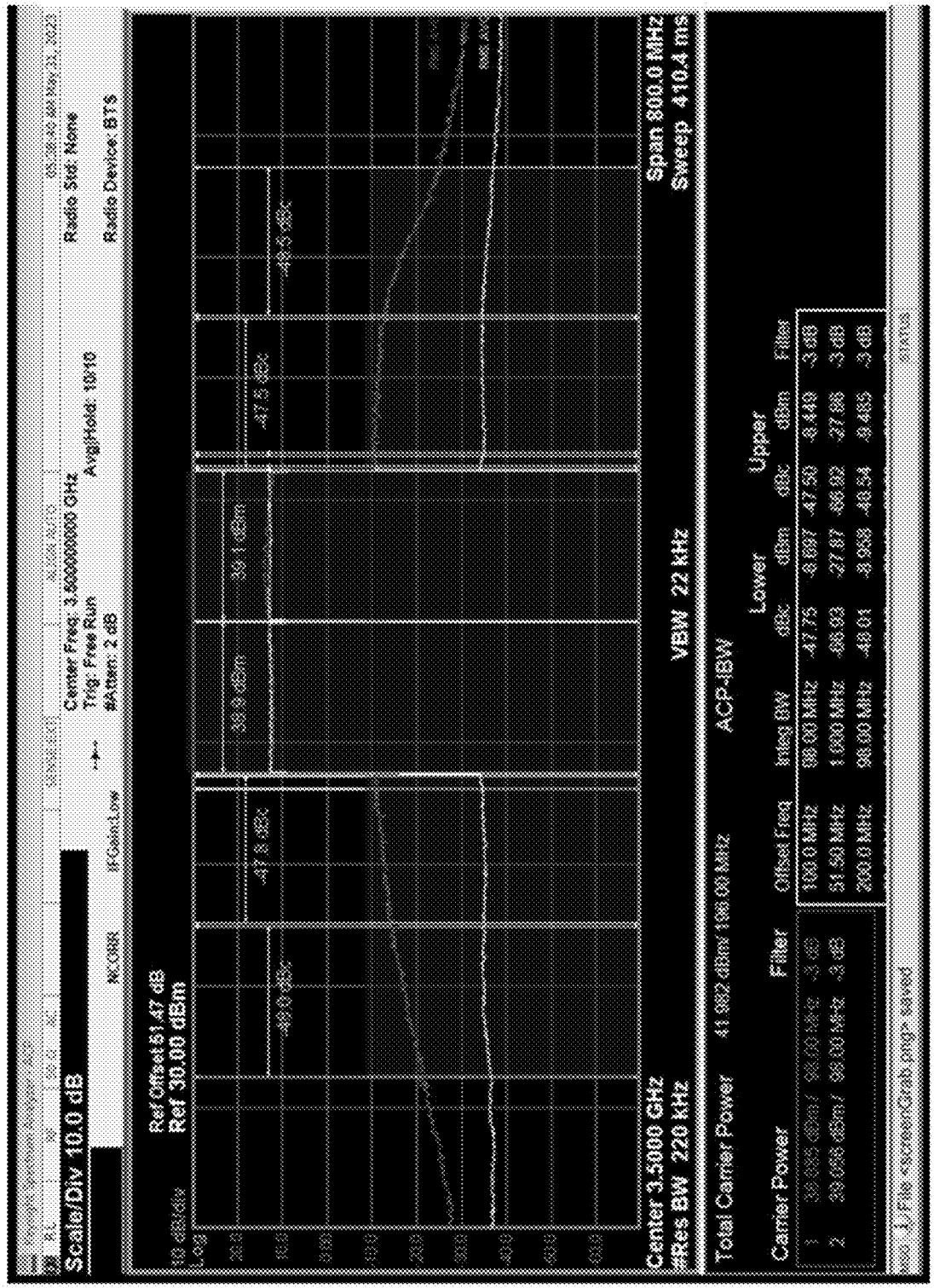
Figure 12B:
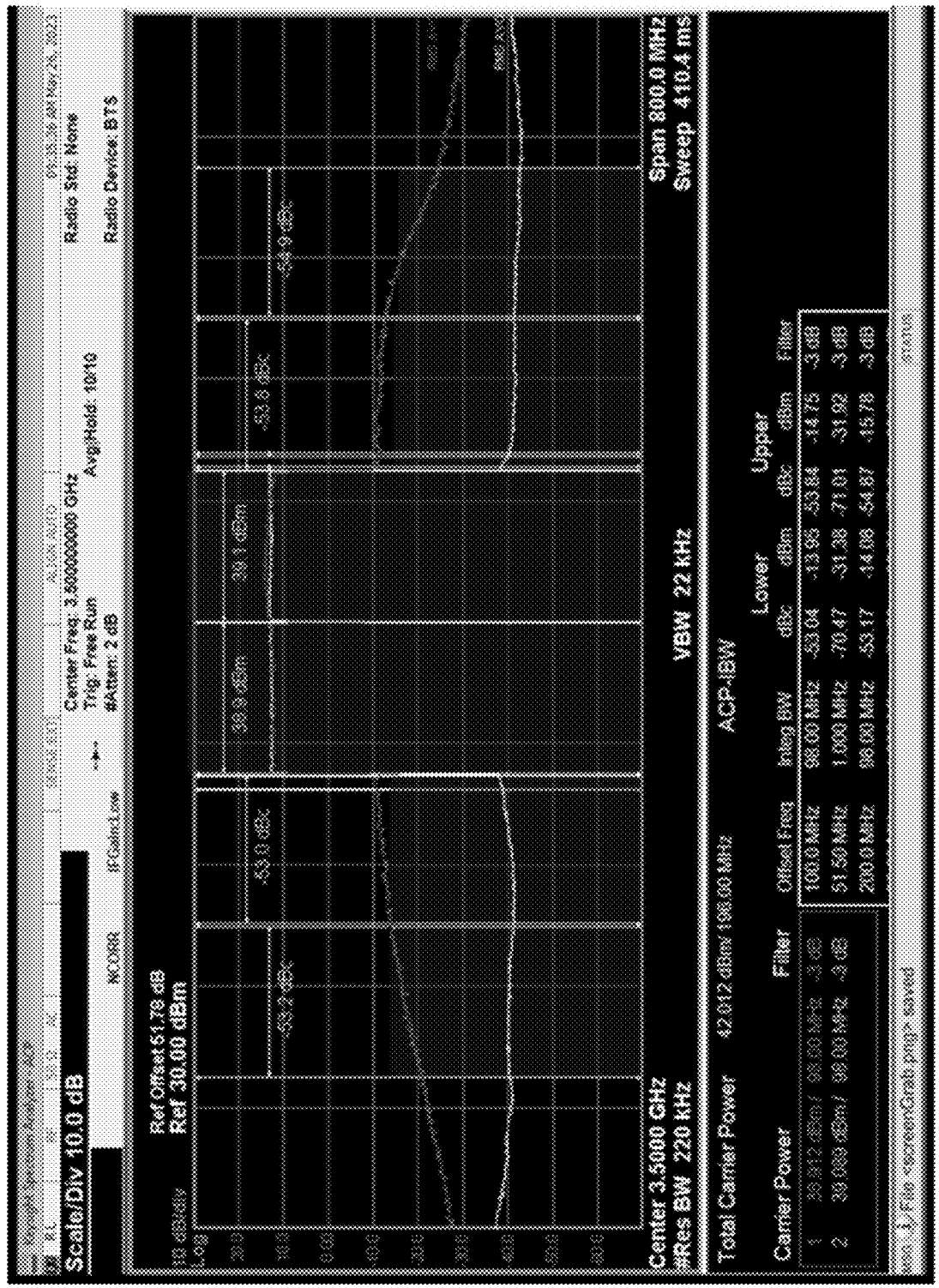

FIGS. 12A-12C illustrate measured results of an implementation of a multistage multi-rate digital predistortion system adapted by a digital predistortion adaptation circuit implementing back propagation and least square estimate adaptive algorithm in accordance with certain embodiments. FIG. 12A illustrates measurements for a 1-stage digital predistortion system 204 processing a signal with a 3.5 GHz center frequency. FIG. 12B illustrates measurements for a 6-stage digital predistortion system 204 processing the same signal as FIG. 12A. Comparing the 1-stage and 6-stage graphs illustrated in FIGS. 12A-12B, it can be seen that there is an improvement the ACLR with the addition of more stages within the digital predistortion system 204.

FIG. 12C presents a table illustrating the improvement between the 1-stage and 6-stage digital predistortion systems 204. As illustrated in the table, the number of coefficients drops by over a hundred when increasing the number of stages. While at the same time, the ACLR can be improved by at least 5 dB with the OBUE being improved by 3.5 dB/MHz.

Terminology

Conditional language used herein, such as, among others, "can," "could," "might," "may," "e.g.," and the like, unless specifically stated otherwise, or otherwise understood within the context as used, may be generally intended to convey that certain embodiments include, while other embodiments do not include, certain features, elements and/or states. Thus, such conditional language may be not generally intended to imply that features, elements and/or states may be in any way required for one or more embodiments or that one or more embodiments necessarily include these features, elements and/or states.

Conjunctive language such as the phrase "at least one of X, Y, and Z," unless specifically stated otherwise, may be otherwise understood with the context as used in general to convey that an item, term, etc. may be either X, Y, or Z. Thus, such conjunctive language may be not generally intended to imply that certain embodiments require the presence of at least one of X, at least one of Y, and at least one of Z.

While the above detailed description may have shown, described, and pointed out novel features as applied to various embodiments, it may be understood that various omissions, substitutions, and/or changes in the form and details of any particular embodiment may be made without departing from the spirit of the disclosure. As may be recognized, certain embodiments may be embodied within a form that does not provide all of the features and benefits set forth herein, as some features may be used or practiced separately from others.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Additionally, features described in connection with one embodiment can be incorporated into another of the disclosed embodiments, even if not expressly discussed herein, and embodiments may have the combination of features still fall within the scope of the disclosure. For example, features described above in connection with one embodiment can be used with a different embodiment described herein and the combination still fall within the scope of the disclosure.

It should be understood that various features and aspects of the disclosed embodiments can be combined with, or substituted for, one another in order to form varying modes of the embodiments of the disclosure. Thus, it may be intended that the scope of the disclosure herein should not be limited by the particular embodiments described above. Accordingly, unless otherwise stated, or unless clearly incompatible, each embodiment of this disclosure may comprise, additional to its essential features described herein, one or more features as described herein from each other embodiment disclosed herein.

Features, materials, characteristics, or groups described in conjunction with a particular aspect, embodiment, or example may be to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps may be mutually exclusive. The protection may be not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

Moreover, while operations may be depicted in the drawings or described in the specification in a particular order, such operations need not be performed in the particular order shown or in sequential order, or that all operations be performed, to achieve desirable results. Other operations that may be not depicted or described can be incorporated in the example methods and processes. For example, one or more additional operations can be performed before, after, simultaneously, or between any of the described operations. Further, the operations may be rearranged or reordered in other implementations, including being performed at least partially in parallel. Those skilled in the art will appreciate that in some embodiments, the actual steps taken in the processes illustrated and/or disclosed may differ from those shown in the figures. Depending on the embodiment, certain of the steps described above may be removed, others may be added.

For purposes of this disclosure, certain aspects, advantages, and novel features may be described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that may be within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure may be not intended to be limited by the specific disclosures of preferred embodiments in this section or elsewhere in this specification, and may be defined by claims as presented in this section or elsewhere in this specification or as presented in the future. The language of the claims may be to be interpreted broadly based on the language employed in the claims and not limited to the examples described in the present specification or during the prosecution of the application, which examples may be to be construed as non-exclusive.

Unless the context clearly may require otherwise, throughout the description and the claims, the words "comprise", "comprising", and the like, may be construed in an inclusive sense as opposed to an exclusive or exhaustive sense, that may be to say, in the sense of "including, but not limited to".

What is claimed is:

1. A digital predistortion system configured to distort a power amplifier input signal prior to being input to a power amplifier, the digital predistortion system comprising:

a first compensator comprising a first plurality of processing circuit blocks, wherein each processing circuit block of the first plurality of processing circuit blocks is configured to implement a first transformation function to modify a linearity of a first input signal that is input to the first compensator, wherein each processing circuit block of the first plurality of processing circuit blocks is connected in parallel within the first compensator, and wherein at least one processing circuit block of the first plurality of processing circuit blocks implements a different transformation function than at least one other processing circuit block of the first plurality of processing circuit blocks;

a second compensator connected in series with the first compensator, the second compensator comprising a second plurality of processing circuit blocks, wherein each processing circuit block of the second plurality of processing circuit blocks is configured to implement a second transformation function to modify a linearity of a second input signal that is input to the second compensator, wherein each processing circuit block of the second plurality of processing circuit blocks is connected in parallel within the second compensator, wherein the second input signal is based at least in part on an output of the first compensator, and wherein at least one processing circuit block of the second plurality of processing circuit blocks implements a different transformation function than at least one other processing circuit block of the second plurality of processing circuit blocks;

a set of one or more additional compensators connected in series between the first compensator and the second compensator; and a first adder circuit configured to sum an output of each processing circuit block of the second plurality of processing circuit blocks to obtain a digital predistortion signal, wherein the first adder circuit is further configured to provide the digital predistortion signal as an input to the power amplifier.

2. The digital predistortion system of claim 1, wherein at least one of the first plurality of processing circuit blocks or the second plurality of processing circuit blocks implements a neural network.

3. The digital predistortion system of claim 1, wherein the second compensator further comprises the first adder circuit.

4. The digital predistortion system of claim 1, wherein each processing circuit block of the first plurality of processing circuit blocks is configured to generate an output that is supplied as an input to a corresponding processing circuit block of the second plurality of processing circuit blocks.

5. The digital predistortion system of claim 1, wherein the first compensator further comprises a second adder circuit configured to sum an output of each processing circuit block of the first plurality of processing circuit blocks to obtain an intermediary signal, wherein the intermediary signal is supplied as an input to the second compensator.

6. The digital predistortion system of claim 1, wherein at least one of the first compensator or the second compensator comprises a memory that stores signal samples enabling at least the first transformation function or the second transformation function to operate over a larger range of samples than a memoryless compensator.

7. The digital predistortion system of claim 1, wherein a combination of at least the first compensator and the second compensator is configured to generate a distortion of the power amplifier input signal such that a total system response of a system that includes the power amplifier is linear.

8. The digital predistortion system of claim 1, wherein the first compensator further comprises a plurality of down sampling circuits corresponding to the first plurality of processing circuit blocks, wherein each of the plurality of down sampling circuits is configured to down sample the first input signal to obtain a down sampled input signal that is input to the corresponding processing circuit block of the first plurality of processing circuit blocks.

9. The digital predistortion system of claim 1, wherein the first compensator further comprises a plurality of up sampling circuits corresponding to the first plurality of processing circuit blocks, wherein each of the plurality of up sampling circuits is configured to up sample an output of the corresponding processing circuit block of the first plurality of processing circuit blocks.

10. The digital predistortion system of claim 1, wherein at least the first transformation function or the second transformation function comprises one or more of a set of mathematical series or models configured to modify the linearity of an applied signal.

11. The digital predistortion system of claim 1, wherein at least the first transformation function or the second transformation function comprises one or more weighted coefficients that are set based on a digital predistortion adaptation circuit configured to determine the one or more weighted coefficients using an adaptive algorithm applied to an output of the power amplifier.

12. The digital predistortion system of claim 1, wherein at least the first transformation function or the second transformation function comprises one or more weighted coefficients that are set based on a digital predistortion adaptation circuit configured to determine the one or more weighted coefficients using back propagation and a least square estimate algorithm applied to an output of the power amplifier.

13. A transceiver radio comprising:
a digital predistortion system connected in series with a power amplifier, the digital predistortion system comprising:
a plurality of compensator circuits connected in series, wherein each compensator circuit of the plurality of compensator circuits comprises a plurality of nonlinearity processing circuits connected in parallel and configured to implement a transformation function to modify a linearity of an input signal received at a first compensator circuit of the plurality of compensator circuits, and wherein at least one nonlinearity processing circuit of the plurality of nonlinearity processing circuits implements a different transformation function than at least one other nonlinearity processing circuit of the plurality of nonlinearity processing circuits, wherein the transformation function comprises one or more weighted coefficients that are set based on a digital predistortion adaptation circuit configured to determine the one or more weighted coefficients using back propagation; and
an adder circuit configured to sum an output of each nonlinearity processing circuit of the plurality of nonlinearity processing circuits of a last compensator circuit of the plurality of compensator circuits to obtain a digital predistortion signal, wherein the adder circuit is further configured to provide the digital predistortion signal as an input to the power amplifier.

14. The transceiver radio of claim 13, further comprising a crest factor reduction circuit configured to receive a transmit signal and to reduce a peak-to-peak average power ratio of the transmit signal to obtain a reduced peak-to-peak transmit signal, wherein the reduced peak-to-peak transmit signal is provided as an input signal to the digital predistortion system.

15. The transceiver radio of claim 13, further comprising the digital predistortion adaptation circuit configured to receive an output of the power amplifier and to configure the one or more weighted coefficients of the transformation function of at least one compensator circuit of the plurality of compensator circuits based at least in part on the output of the power amplifier.

16. The transceiver radio of claim 13, wherein at least one compensator circuit of the plurality of compensator circuits further comprises a plurality of down sampling circuits corresponding to the plurality of nonlinearity processing circuits, and wherein each of the plurality of down sampling circuits is configured to down sample the input signal to obtain a down sampled input signal that is input to the corresponding nonlinearity processing circuit of the plurality of nonlinearity processing circuits.

17. The transceiver radio of claim 13, wherein at least one compensator circuit of the plurality of compensator circuits further comprises a plurality of up sampling circuits corresponding to the plurality of nonlinearity processing circuits, and wherein each of the plurality of up sampling circuits is configured to up sample an output of the corresponding nonlinearity processing circuit of the plurality of nonlinearity processing circuits.

18. A wireless device comprising:
an antenna configured to emit a signal received from a power amplifier;
the power amplifier;
a transceiver comprising a digital predistortion system connected in series with the power amplifier, the digital predistortion system comprising:
a plurality of compensator circuits connected in series, wherein each compensator circuit of the plurality of compensator circuits comprises a plurality of nonlinearity processing circuits connected in parallel and configured to implement a transformation function to modify a linearity of an input signal received at a first compensator circuit of the plurality of compensator circuits, and wherein at least one nonlinearity processing circuit of the plurality of nonlinearity processing circuits implements a different transformation function than at least one other nonlinearity processing circuit of the plurality of nonlinearity processing circuits; and
an adder circuit configured to sum an output of each nonlinearity processing circuit of the plurality of nonlinearity processing circuits of a last compensator circuit of the plurality of compensator circuits to obtain a digital predistortion signal, wherein the adder circuit is further configured to provide the digital predistortion signal as an input to the power amplifier;
a digital predistortion adaptation circuit configured to receive an output of the power amplifier and to configure one or more coefficients of the transformation function of at least one compensator circuit of the plurality of compensator circuits based at least in part on the output of the power amplifier, wherein the digital predistortion adaptation circuit is configured to determine the one or more coefficients using back propagation; and
a coupler configured to provide the output of the power amplifier to the digital predistortion adaptation circuit.

* * * * *